United States Patent
Yoo et al.

(10) Patent No.: US 11,509,903 B2
(45) Date of Patent: Nov. 22, 2022

(54) METHOD AND DEVICE FOR CODING TRANSFORM SKIP FLAG

(71) Applicant: LG ELECTRONICS INC., Seoul (KR)

(72) Inventors: Sunmi Yoo, Seoul (KR); Jungah Choi, Seoul (KR); Seunghwan Kim, Seoul (KR); Jin Heo, Seoul (KR); Jangwon Choi, Seoul (KR); Jaehyun Lim, Seoul (KR); Ling Li, Seoul (KR)

(73) Assignee: LG ELECTRONICS INC., Seoul (KR)

(*) Notice: Subject to any disclaimer, the term of this patent is extended or adjusted under 35 U.S.C. 154(b) by 5 days.

(21) Appl. No.: 17/294,943

(22) PCT Filed: Nov. 27, 2019

(86) PCT No.: PCT/KR2019/016407
§ 371 (c)(1),
(2) Date: May 18, 2021

(87) PCT Pub. No.: WO2020/111749
PCT Pub. Date: Jun. 4, 2020

(65) Prior Publication Data
US 2022/0021882 A1    Jan. 20, 2022

Related U.S. Application Data

(60) Provisional application No. 62/771,582, filed on Nov. 27, 2018.

(51) Int. Cl.
*H04N 19/132*    (2014.01)
*H04N 19/105*    (2014.01)
(Continued)

(52) U.S. Cl.
CPC ......... *H04N 19/132* (2014.11); *H04N 19/105* (2014.11); *H04N 19/176* (2014.11);
(Continued)

(58) Field of Classification Search
CPC .. H04N 19/132; H04N 19/105; H04N 19/176; H04N 19/186; H04N 19/1883;
(Continued)

(56) References Cited

U.S. PATENT DOCUMENTS

| | | | |
|---|---|---|---|
| 11,290,716 B2* | 3/2022 | Misra | H04N 19/159 |
| 2018/0199072 A1* | 7/2018 | Li | H04N 19/186 |
| 2018/0310003 A1 | 10/2018 | Kim | |

FOREIGN PATENT DOCUMENTS

| | | |
|---|---|---|
| KR | 1020140081681 A | 12/2013 |
| KR | 101707164 B1 | 2/2017 |

(Continued)

*Primary Examiner* — Susan E. Torgerson
(74) *Attorney, Agent, or Firm* — Dentons US LLP

(57) ABSTRACT

An image decoding method according to the present document may include: a step for determining whether a current block is a dual-tree type in which individual division structures are applied to a luma component block and a chroma component block of the current block; a step for determining whether the current block is the luma component block to which the dual-tree type is applied, when the current block is determined to be the dual-tree type; a step for parsing a transform skip flag indicating whether a transform skip is applied to the luma component block, when the current block is the luma component block; a step for deriving whether a transform skip is applied to the chroma component block according to a preset condition, when the current block is not the luma component block; and a step for deriving a residual sample on the basis of the transform skip flag and residual information on the current block.

13 Claims, 31 Drawing Sheets

(51) Int. Cl.
*H04N 19/46* (2014.01)
*H04N 19/186* (2014.01)
*H04N 19/176* (2014.01)
*H04N 19/169* (2014.01)

(52) U.S. Cl.
CPC ....... *H04N 19/186* (2014.11); *H04N 19/1883* (2014.11); *H04N 19/46* (2014.11)

(58) Field of Classification Search
CPC ...... H04N 19/46; H04N 19/12; H04N 19/157; H04N 19/70
USPC ......................................................... 375/240
See application file for complete search history.

(56) References Cited

FOREIGN PATENT DOCUMENTS

| KR | 1020170046112 A | 4/2017 |
| KR | 1020170077203 A | 7/2017 |

* cited by examiner

METHOD AND DEVICE FOR CODING TRANSFORM SKIP FLAG

CROSS-REFERENCE TO RELATED APPLICATION

This application is the National Stage filing under 35 U.S.C. 371 of International Application No. PCT/KR2019/016407, filed on Nov. 27, 2019, which claims priority to and the benefit of U.S. Provisional Application No. 62/771,582, filed on Nov. 27, 2018, which is incorporated herein by reference in its entirety.

BACKGROUND OF DISCLOSURE

Field of the Disclosure

This disclosure relates to an image coding technology, and more particularly, to a method and apparatus for coding a transform skip flag according to luma and chroma components.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

The present document is to provide a method and apparatus for improving image coding efficiency.

This document is also to provide a method and apparatus for increasing the efficiency of coding a transform skip flag according to luma or chroma components.

This document is also to provide a method and apparatus for increasing the efficiency of coding a transform skip flag according to a tree structure.

According to an embodiment of the present document, there is provided an image decoding method performed by a decoding apparatus, the method including: deriving a residual sample for a current block; determining whether or not a current block is a dual tree type where separate partition structures are applied to a luma component block and a chroma component block of the current block; determining whether or not the current block is a luma component block to which the dual tree type is applied, when the current block is the dual tree type; deriving a transform skip flag related to whether or not transform skip is applied to the luma component block, when the current block is the luma component block; deriving whether or not transform skip is applied to the chroma component block according to a preset condition, when the current block is not the luma component block; encoding image information including residual information for the current block and the transform skip flag.

Alternatively, according to another embodiment of the present document, there is provided an image decoding method performed by a decoding apparatus, the method including: receiving component information related to whether a current block is a luma component block or a chroma component block, and residual information for the current block; parsing a transform skip flag related to whether or not transform skip is applied to the luma component block, when the current block is the luma component block; deriving whether or not transform skip is applied to the chroma component block according to a preset condition, when the current block is not the luma component block; deriving a residual sample for the luma component block based on the residual information and the transform skip flag; deriving a residual sample for the chroma component block based on whether or not the transform skip is applied and the residual information; and generating a reconstructed picture based on the residual sample for the current block.

According to still another embodiment of the present document, there is provided an image encoding method by an encoding apparatus, the method including: deriving a residual sample for a current block; determining whether or not a current block is a dual tree type where separate partition structures are applied to a luma component block and a chroma component block of the current block; determining whether or not the current block is a luma component block to which the dual tree type is applied, when the current block is the dual tree type; deriving a transform skip flag related to whether or not transform skip is applied to the luma component block, when the current block is the luma component block; deriving whether or not transform skip is applied to the chroma component block according to a preset condition, when the current block is not the luma component block; and encoding image information including residual information for the current block and the transform skip flag.

According to still another embodiment of the present document, an image decoding apparatus for performing an image decoding method includes: a residual processor which determines whether or not a current block is a dual tree type where separate partition structures are applied to a luma component block and a chroma component block of the current block, determines whether or not the current block is a luma component block to which the dual tree type is applied, when the current block is the dual tree type, parses a transform skip flag related to whether or not transform skip is applied to the luma component block, when the current block is the luma component block, derives whether or not transform skip is applied to the chroma component block according to a preset condition, when the current block is not the luma component block, derives a residual sample for the luma component block based on residual information for the current block and the transform skip flag, and derives a residual sample for the chroma component block based on whether or not the transform skip is applied and the residual information; and an adder which generates a reconstructed picture based on the residual sample for the current block.

According to still another embodiment of the present document, there is provided an encoding apparatus for performing image encoding. The encoding apparatus includes a residual processor which determines whether or not a current block is a dual tree type where separate partition structures are applied to a luma component block and a chroma component block of the current block, determines whether or not the current block is a luma component block to which the dual tree type is applied, when the current block is the dual tree type, parses a transform skip flag related to whether or not transform skip is applied to the luma component block, when the current block is the luma component block, derives whether or not transform skip is applied to the chroma component block according to a preset condition, when the current block is not the luma component block, derives a residual sample for the luma component block based on residual information for the current block and the transform skip flag, and derives a residual sample for the chroma component block based on whether or not the transform skip is applied and the residual information; and an encoder which encodes residual information including information on a quantized transform coefficient and a transform skip flag.

According to still another embodiment of the present document, a digital storage medium in which image data including encoded image information generated according to the image encoding method performed by an encoding apparatus is stored may be provided.

According to still another embodiment of the present document, a digital storage medium in which image data including encoded image information causing the decoding apparatus to perform the image decoding method is stored may be provided.

According to an embodiment of the present document, it is possible to improve overall image/video compression efficiency.

According to an embodiment of the present document, it is possible to increase the efficiency of coding a transform skip flag according to luma or chroma components.

According to the present document, it is possible to increase the efficiency of coding a transform skip flag according to a tree structure.

DESCRIPTION OF EMBODIMENTS

Figure 1:
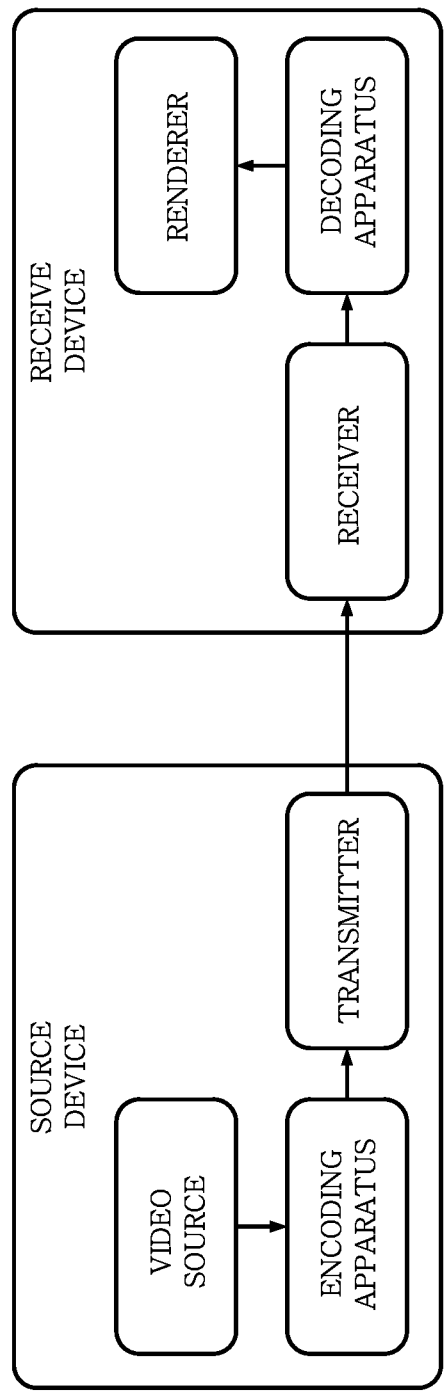
FIG. 1 schematically represents an example of a video/image coding system to which the present document may be applied.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, the respective structures in the drawings of the present specification are provided independently from each other for the convenience of describing different characteristic functions, which, however, does not indicate that each structure should be implemented by separate hardware or separate software. For example, each structure may be implemented by a combination of two or more structures, or one structure may be split into a plurality of structures. An embodiment in which structures are integrated into one and/or separated from each other should be regarded as belonging to the scope of the present specification unless it departs from the technical spirit of a method disclosed in the present specification.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, a method/embodiment disclosed in this document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into a multiple bricks, each of which may be constructed with one or more CTU rows within the tile. A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture. A tile is a particular tile column and a rectangular region of CTUs within a particular tile column. The tile column is a rectangular region of CTUs, which has a height equal to the height of the picture and a width that may be specified by syntax elements in the picture parameter set. The tile row is a rectangular region of CTUs, which has a width specified by syntax elements in the picture parameter set and a height that may be equal to the height of the picture. A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture. A slice may include an integer number of bricks of a picture, and the integer number of bricks may be included in a single NAL unit. A slice may be constructed with multiple complete tiles, or may be a consecutive sequence of complete bricks of one tile. In this document, a tile group and a slice may be used in place of each other. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the symbol"/" and "," should be interpreted as "and/or." For example, the expression "A/B" is interpreted as "A and/or B", and the expression "A, B" is interpreted as "A and/or B." Additionally, the expression "A/B/C" means "at least one of A, B, and/or C." Further, the expression "A, B, C" also means "at least one of A, B, and/or C."

Additionally, in the present document, the term "or" should be interpreted as "and/or." For example, the expression "A or B" may mean 1) only "A", 2) only "B", and/or 3) "both A and B." In other words, the term "or" in the present document may mean "additionally or alternatively."

Figure 2:
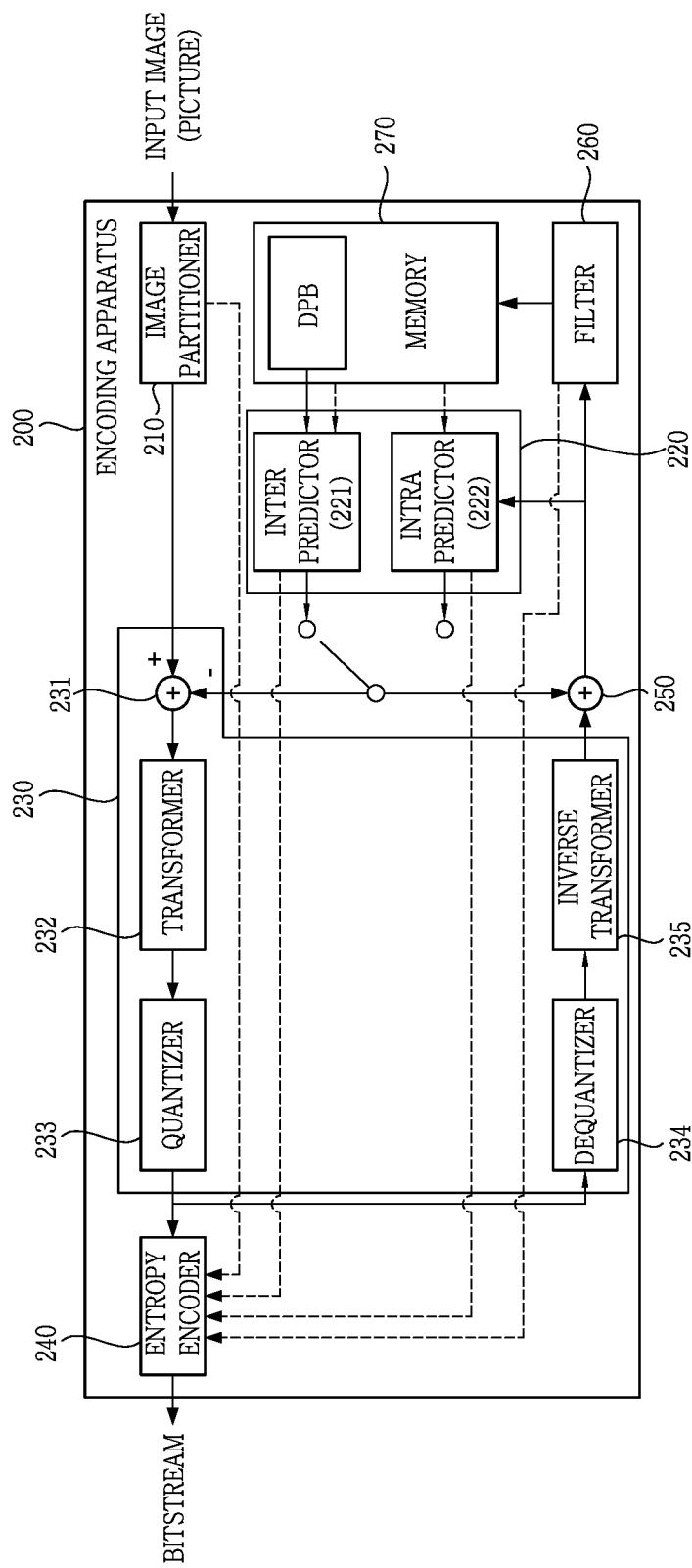
FIG. 2 is a diagram schematically illustrating a configuration of a video/image encoding apparatus to which the present document may be applied.

FIG. 2 is a diagram schematically illustrating a configuration of a video/image encoding apparatus to which the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
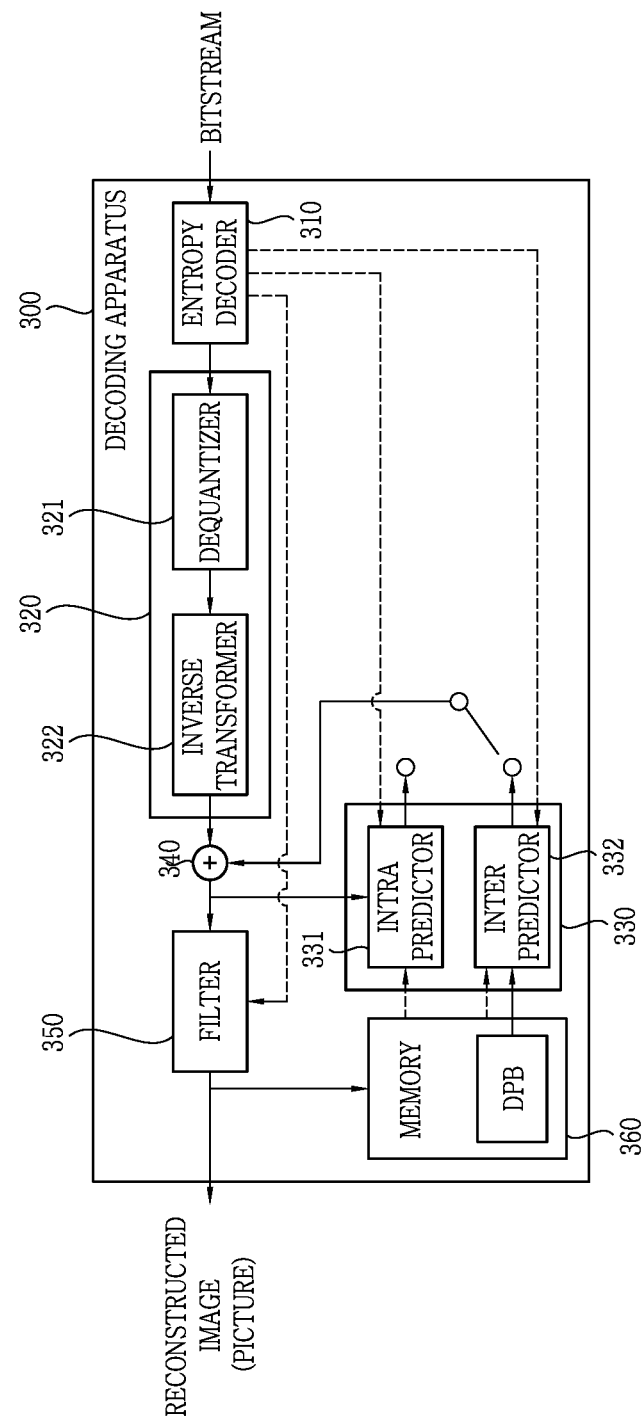
FIG. 3 is a diagram schematically illustrating a configuration of a video/image decoding apparatus to which the present document may be applied.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor 330 may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Meanwhile, pictures may be divided into a sequence of coding tree units (CTUs). The coding tree unit may correspond to a coding tree block (CTB). Alternatively, the coding tree unit may include a coding tree block of luma samples, and two coding tree blocks of corresponding chroma samples. In other words, for a picture including three kinds of sample arrays, the coding tree unit may include an N×N block of luma samples and two corresponding blocks of chroma samples.

A maximum allowed size of a coding tree unit for coding, prediction and the like may be different from a maximum allowed size of a coding tree unit for transform. For example, a maximum allowed size of a luma block in a coding tree unit may be 128×128, and a maximum size of luma transform blocks may be 64×64.

A coding tree unit may be divided into coding units based on a quad-tree (QT) structure. The quad-tree structure may be called a quaternary tree structure. This is for reflecting various local characteristics. Meanwhile, in the present document, a coding tree unit may be divided based on multi-type tree structure partition including a binary-tree (BT) and a ternary-tree (TT) as well as a quad-tree. Hereinafter, a QTBT structure may include a quad-tree and binary-tree based partition structure, and the QTBTTT may include a quad-tree, binary-tree, and ternary-tree based partition structure. Alternatively, the QTBT structure may include a quad-tree, binary-tree and ternary-tree based partition structure.

In a coding tree structure, a coding unit may have a square or rectangular shape. The coding tree unit may first be divided into the quad-tree structure. Then, leaf nodes of the quad-tree structure may be further divided by the multi-type tree structure. For example, the multi-type tree structure may include schematically four partition types.

The four partition types may include vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR).

As an example of the quad-tree coding tree structure with nested multi-type tree, a coding tree unit size may be set as a 128×128 luma sample block and two corresponding 64×64 chroma sample blocks in 4:2:0 chroma format. In this case, MinOTSize indicating the minimum quad-tree size may be set to 16×16, MaxBtSize indicating the size of the maximum binary tree (binary-tree) may be set to 128×128, MaxTtSzie may be set to 64×64, MinBtSize and MinTtSize (for both width and height) may be set to 4×4, and MaxMttDepth may be set to 4.

The quad-tree partitioning may be applied to a coding tree unit and generate quad-tree leaf nodes. The quad-tree leaf node may be called a leaf QT node. The quad-tree leaf nodes may have a size from 16×16 size (e.g., the MinOTSize) to 128×128 size (e.g., the coding tree unit (CTU) size). In the case that a leaf QT node is 128×128, the leaf QT node may not be additionally partitioned into a binary-tree/ternary-tree. This is because the leaf QT node exceeds MaxBtsize and MaxTtszie (e.g., 64×64) even in the case the leaf QT node is partitioned. In other case, the leaf QT node may be additionally partitioned into a multi-type tree. Therefore, the leaf QT node may be a root node for the multi-type tree, and the leaf QT node may have multi-type tree depth (mttDepth) 0 value. In the case that the multi-type tree depth reaches MaxMttdepth (e.g., 4), no more additional partition may be considered. In the case that a width of the multi-type tree node is equal to MinBtSize and smaller than or equal to 2×MinTtSize, no more additional horizontal partition may be considered. In the case that a height of the multi-type tree node is equal to MinBtSize and smaller than or equal to 2×MinTtSize, no more additional vertical partition may be considered.

In order to support 64×64 luma block and 32×32 chroma pipeline design in a hardware decoder, a TT split may be forbidden in a specific case. For example, in the case that a width or a height of a luma coding block is greater than 64, a TT split may be forbidden. Further, for example, in the case that a width or a height of a chroma coding block is greater than 32, a TT split may be forbidden.

In the present document, the coding tree structure may support that a luma and chroma block have separate block tree structures. With respect to P and B slices, luma and chroma coding tree blocks in a single coding tree unit may be limited to have the same coding tree structure. However, with respect to I slices, luma and chroma blocks may have respectively separate block tree structures. In the case that separate block tree modes are applied, a luma coding tree block may be partitioned into coding units based on a specific coding tree structure, and a chroma coding tree block may be partitioned into chroma coding units based on a different coding tree structure. This may mean that a coding unit in I slice may include a coding block of a luma component or coding blocks of two chroma components, and a coding unit in P or B slice may include blocks of three color components.

In the partitioning of the coding tree unit using described-above tree structure, the quad-tree coding tree structure with nested multi-type tree is described, but a structure in which a coding unit is partitioned is not limited thereto. For example, BT structure and TT structure may be interpreted as a concept included in the multiple partitioning tree (MPT) structure, and a coding unit may be interpreted as being partitioned through QT structure and MPT structure. In an example in which a CU is partitioned through QT structure and MPT structure, the partition structure may be determined by signaling a syntax element (e.g., MPT_split_type) including information on the number of blocks to which a leaf node of QT structure is partitioned, and a syntax element (e.g., MPT_split_mode) including information on a direction to which a leaf node of QT structure is partitioned between vertical and horizontal directions.

In still another example, a coding unit may be partitioned in a method different from QT structure, BT structure or TT structure. That is, different from that a coding unit of a lower layer depth is partitioned to ¼ size of a coding unit of a higher layer depth according to QT structure, or that a coding unit of a lower layer depth is partitioned to ½ size of a coding unit of a higher layer depth according to BT structure, or that a coding unit of a lower layer depth is partitioned to ¼ size or ½ size of a coding unit of a higher layer depth according to TT structure, a coding unit of a lower layer depth may be partitioned into ⅕, ⅓, ⅜, ⅗, ⅔ or ⅝ size of a coding unit of a higher layer depth in some cases, but a method of partitioning a coding unit is not limited thereto.

Figure 4:
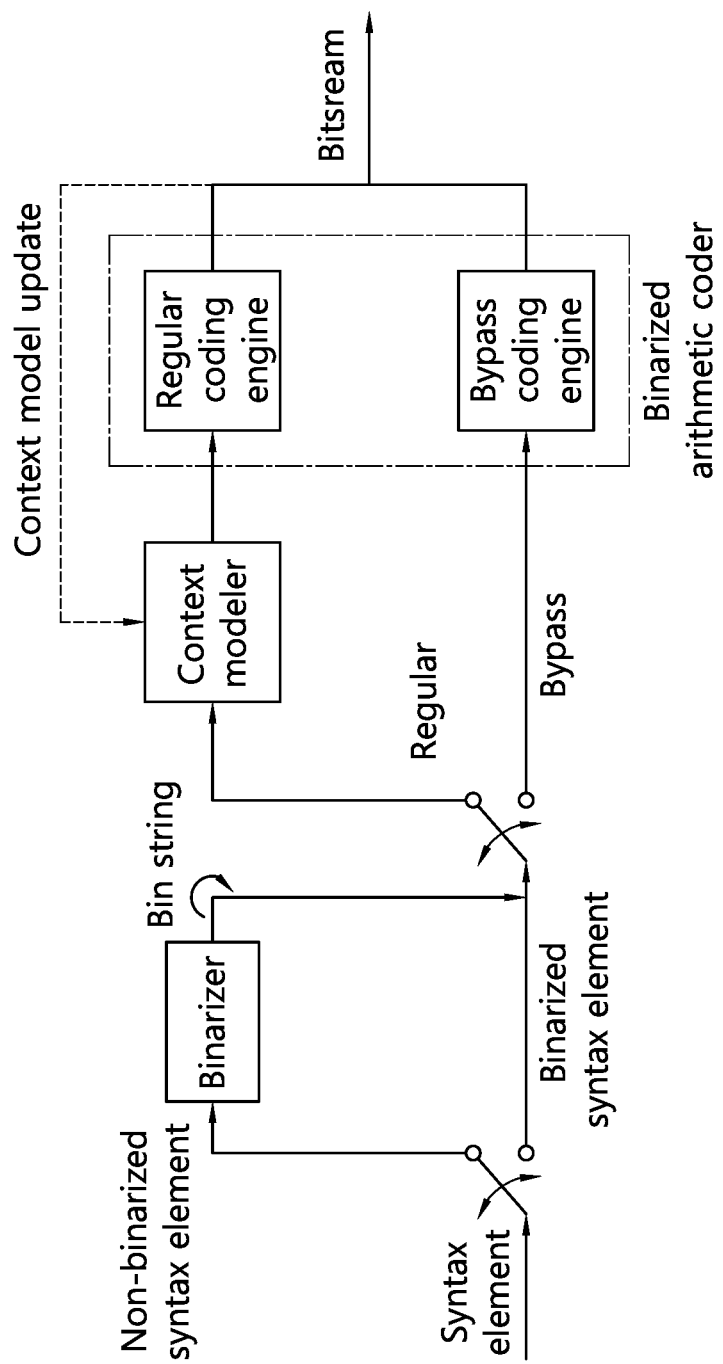
FIG. 4 is a diagram illustrating a block diagram of a CABAC encoding system according to an embodiment.

FIG. 4 shows a block diagram of context-adaptive binary arithmetic coding (CABAC) for encoding a single syntax element, as a diagram illustrating a block diagram of a CABAC encoding system according to an embodiment.

In a case where an input signal is a non-binarized syntax element, an encoding process of the CAB AC first converts the input signal into a binarized value through binarization. In a case where an input signal is already a binarized value, the input signal bypasses the binarization without being subject to it, and input to an encoding engine. Here, each binary number 0 or 1 constituting the binary value is referred to as a bin. For example, in a case where a binary string after the binarization is '110', each of 1, 1, and 0 is referred to as a bin. The bin(s) for a syntax element may be a value of the syntax element.

Binarized bins are input to a regular encoding engine or a bypass encoding engine.

The regular encoding engine assigns to a corresponding bin a context model reflecting a probability value, and encodes the bin based on the assigned context model. After performing the encoding on each bin, the regular encoding engine may update a probability model for the bin. The thus encoded bins are referred to as context-coded bins.

The bypass encoding engine omits a process of estimating a probability for an input bin, and a process of updating the probability model which has been applied to the bin, after the encoding. The bypass encoding engine improves an encoding speed by encoding bins being input thereto while applying uniform probability distribution instead of assigning a context. The thus encoded bins are referred to as bypass bins.

The entropy encoding may determine whether to perform the encoding through the regular encoding engine or through the bypass encoding engine, and switch an encoding path. The entropy decoding performs the same processes as those of the encoding in a reverse order.

Meanwhile, in an embodiment, a (quantized) transform coefficient is encoded and/or decoded based on syntax elements, such as transform_skip_flag, last_sig_coeff_x_prefix, last_sig_coeff_y_prefix, last_sig_coeff_x_suffix, last_sig_coeff y_suffix, coded_sub_block_flag, sig_coeff_flag, par_level_flag, rem_abs_gt1_flag, rem_abs_gt2_flag, abs remainder, coeff_sign_flag, mts_idx and the like. Table 1 below shows syntax elements related to the residual data encoding according to an example.

TABLE 1

| | Descriptor |
|---|---|
| residual_coding( x0, y0, log2TbWidth, log2TbHeight, cIdx ) { | |
|     if( transform_skip_enabled_flag && ( cIdx ! = 0 \|\| cu_mts_flag[ x0 ][ y0 ] = = 0 ) && | |
|       ( log2TbWidth <= 2 ) && ( log2TbHeight <= 2 )) | |
|       transform_skip_flag[ x0 ][ y0 ][ cIdx ] | ae(v) |
|     last_sig_ceoff_x_prefix | ae(v) |
|     last_sig_ceoff_y_prefix | ae(v) |
|     if( last_sig_coeff_x_prefix > 3 ) | |
|       last_sig_ceoff_x_suffix | ae(v) |
|     if( last_sig_coeff_y_prefix > 3 ) | |
|       last_sig_ceoff_y_suffix | ae(v) |
|     log2SbSize = ( Min( log2TbWidth, log2TbHeight ) < 2 ? 1 : 2 ) | |
|     numSbCoeff = 1 << ( log2SbSize << 1 ) | |
|     lastScanPos = numSbCoeff | |
|     lastSubBlock = ( 1 << ( log2TbWidth + log2TbHeight = 2 * log2SbSize )) = 1 | |
|     do { | |
|       if( lastScanPos = = 0 ) { | |
|         lastScanPos = numSbCoeff | |
|         lastSubBlock- - | |
|       } | |
|       lastScanPos- - | |
|       xS = DiagScanOrder[ log2TbWidth - log2SbSize ][ log2TbHeight - log2SbSize ] | |
|           [ lastSubBlock ][ 0 ] | |
|       yS = DiagScanOrder[ log2TbWidth - log2SbSize ][ log2TbHeight - log2SbSize ] | |
|           [ lastSubBlock ][ 1 ] | |
|       xC = ( xS << log2SbSize ) + | |
|         DiagScanOrder[ log2SbSize ][ log2SbSize ][ lastScanPos ][ 0 ] | |
|       yC = ( yS << log2SbSize ) + | |
|         DiagScanOrder[ log2SbSize ][ log2SbSize ][ lastScanPos ][ 1 ] | |
|     } while(( xC != LastSignificantCoeffX ) \|\| ( yC != LastSignificantCeoffY )) | |
|     QState = 0 | |
|     for( i = lastSubBlock; i >= 0; i- - ) { | |
|       startQStateSb = QState | |
|       xS = DiagScanOrder[ log2TbWidth - log2SbSize ][ log2TbHeight - log2SbSize ] | |
|           [ lastSubBlock ][ 0 ] | |
|       yS = DiagScanOrder[ log2TbWidth - log2SbSize ][ log2TbHeight - log2bSize ] | |
|           [ lastSubBlock ][ 1 ] | |

TABLE 1-continued

|  | Descriptor |
|---|---|
| ```
        inferSbDcSigCoeffFlag = 0
        if( ( i < lastSubBlock ) && ( i > 0 )) {
                coded_Sub_block_flag[ xS ][ yS ]
                inferSbDeSigCoeffFlag = 1
        }
        firstSigScanPosSb = numSbCoeff
        lastSigScanPosSb = −1
        for( n = ( i = = lastSubBlock ) ? lastScanPos − 1 : numSbCoeff − 1; n >= 0; n− − )
{
                xC = ( xS << log2SbSize ) + DiagScanOrder[ log2SbSize ][ log2SbSize ][ n ][ 0 ]
                yC = ( yS << log2SbSize ) + DiagScanOrder[ log2SbSize ][ log2SbSize ][ n ][ 1 ]
                if( coded_sub_block_flag[ xS ][ yS ] && ( n > 0 || !inferSbDeSigCoeffFlag ))
{
                        sig_coeff_flag[ xC ][ yC ]
                }
                if( sig_coeff_flag[ xC ][ yC ] ) {
                        par_level_flag[ n ]
                        rem_abs_gt1_flag[ n ]
                        if( lastSigScanPosSb = = −1 )
                                lastSigScanPosSb = n
                        firstSigScanPosSb = n
                }
                AbsLevelPass1[ xC ][ yC ] =
                        sig_coeff_flag[ xC ][ yC ] + par_level_flag[ n ] + 2 * rem_abs_gt1_flag[ n ]
                if( dep_quant_enabled_flag )
                        QState = QStateTransTable[ QState ][ par_level_flag[ n ] ]
        }
        for( n = numSbCoeff − 1; n >= 0; n− − ) {
                if( rem_abs_gt1_flag[ n ] )
                        rem_abs_gt2_flag[ n ]
        }
        for( n = numSbCoeff − 1; n >= 0; n− − ) {
                xC = ( xS << log2SbSize ) + DiagScanOrder[ log2SbSize ][ log2SbSize ][ n ][ 0 ]
                yC = ( yS << log2SbSize ) + DiagScanOrder[ log2SbSize ][ log2SbSize ][ n ][ 1 ]
                if( rem_abs_gt2_flag[ n ] }
                        abs_remainder[ n ]
                AbsLevel[ xC ][ yC ]= AbsLevelPass1[ xC ][ yC ] +
                                        2 * ( rem_abs_gt2_flag[ n ] * abs_remainder[ n ] }
        }
        if( dep_quant_enabled_flag || !sign_data_hiding_enabled_flag )
                signHidden = 0
        else
                signHidden = ( lastSigScanPosSb − firstSigScanPosSb > 3 ? 1 : 0 )
        for( n = numSbCoeff − 1; n >= 0; n− − ) {
                xC = ( xS << log2SbSize ) + DiagScanOrder[ log2SbSize ][ log2SbSize ][ n ][ 0 ]
                yC = ( yS << log2SbSize ) + DiagScanOrder[ log2SbSize ][ log2SbSize ][ n ][ 1 ]
                if( sig_coeff_flag[ xC ][ yC ] &&
                        ( !signHidden || ( n != firstSigScanPosSb )))
                        coeff_sign_flag[ n ]
}
if( dep_quant_enabled_flag ) {
        QState = startQStateSb
        for( n = numSbCoeff − 1; n >= 0; n− − ) {
                xC = ( xS << log2SbSize ) +
                        DiagScanOrder[ log2SbSize ][ log2SbSize ][ n ][ 0 ]
                yC = ( yS << log2SbSize ) +
                        DiagScanOrder[ log2SbSize ][ log2SbSize ][ n ][ 1 ]
                if( sig_coeff_flag[ xC ][ yC ] )
                        TransCoeffLevel[ x0 ][ cIdx ][ xC ][ yC ] =
                                ( 2 * AbsLevel[ xC ][ yC ] − ( QState > [ ? ] : 0 )) *
                                ( 1 − 2 * coeff_sign_flag[ n ] )
                QState = QStateTransTable[ QState ][ par_level_flag[ n ] ]
} else {
        sumAbsLevel = 0
        for( n = numSbCoeff − 1; n >= 0; n− − ) {
                xC = ( xS << log2SbSize ) +
                        DiagScanOrder[ log2SbSize ][ log2SbSize ][ n ][ 0 ]
                yC = ( yS << log2SbSize ) +
                        DiagScanOrder[ log2SbSize ][ log2SbSize ][ n ][ 1 ]
                if ( sig_coeff_flag[ xC ][ yC ] ) {
                        TransCoeffLevel[ x0 ][ y0 ][ cIdx ][ xC ][ yC ] =
                                AbsLevel[ xC ][ yC ] * ( 1 − 2 * coeff_sign_flag[ n ] )
                        if( signHidden ) {
                                sumAbsLevel += AbsLevel[ xC ][ yC ]
                                if(( n = = firstSigScanPosSb ) && ( sumAbsLevel % 2 ) = = 1 ))
                                        TransCoeffLevel [ x0 ][ y0 ][ cIdx ][ xC ][ yC ] =
                                                −TransCoeffLevel[ x0 ][ y0 ][ cIdx ][ xC ][ yC ]
                        }
``` | ae(v)<br><br><br><br><br><br><br><br>ae(v)<br><br><br>ae(v)<br>ae(v)<br><br><br><br><br><br><br><br><br><br><br>ae(v)<br><br><br><br><br><br><br><br><br><br><br><br><br><br><br><br>ae(v) |

TABLE 1-continued

Descriptor

```
          }
        }
      }
    }
    if( cu_mts_flag[ x0 ][ y0 ] && ( cIdx = = 0 ) &&
        !transform_skip_flag[ x0 ][ y0 ][ cIdx ] &&
        (( CuPredMode[ x0 ][ y0 ] = = MODE_INTRA && numSigCoeff > 2 ) ||
           ( CuPredMode[ x0 ][ y0 ] = = MODE_INTER ))) {
      mts_idx[ x0 ][ y0 ]                                                    ae(v)
}
``` transform_skip_flag indicates whether or not a transform for an associated block is skipped. The associated block may be a coding block (CB) or a transform block (TB). In connection with the transform (and the quantization) and the residual coding process, the CB and the TB may be used interchangeably. For example, as described above, residual samples for the CB may be derived, and (quantized) transform coefficients may be derived through transform and quantization on the residual samples. And through the residual coding process, information (e.g., syntax elements) efficiently indicating positions, sizes, signs or the like of the (quantized) transform coefficients may be generated and signaled. The quantized transform coefficients may be simply called transform coefficients. Generally, in a case where the CB is not greater than a maximum TB, the size of the CB may be the same as that of the TB, and in this case, a target block to be transformed (and quantized) and residual-coded may be called the CB or the TB. Meanwhile, in a case where the CB is greater than the maximum TB, the target block to be transformed (and quantized) and residual-coded may be called the TB. While, hereinafter, syntax elements related to residual coding are described by way of example as being signaled in units of a transform blocks (TBs), the TB and the coding block (CB) may be used interchangeably as described above.

In one embodiment, based on the syntax elements last_sig_coeff_x_prefix, last_sig_coeff_y_prefix, last_sig_coeff_x_suffix, and last_sig_coeff_y_suffix, the (x, y) position information of the last non-zero transform coefficient in the transform block may be encoded. More specifically, last_sig_coeff_x_prefix indicates a prefix of a column position of a last significant coefficient in a scanning order in a transform block; last_sig_coeff_y_prefix indicates a prefix of a row position of a last significant coefficient in the scanning order in the transform block; last_sig_coeff x_suffix indicates a suffix of a column position of a last significant coefficient in the scanning order in the transform block; and last_sig_coeff_y_suffix indicates a suffix of a row position of a last significant coefficient in the scanning order in the transform block. Here, the significant coefficient may be the non-zero coefficient. The scanning order may be a right upward diagonal scanning order. Alternatively, the scanning order may be a horizontal scanning order, or a vertical scanning order. The scanning order may be determined based on whether or not the intra/inter prediction is applied to a target block (CB, or CB including TB), and/or a specific intra/inter prediction mode.

Next, after dividing a transform block into 4×4 sub-blocks, a one-bit syntax element for coded_sub_block_flag, may used for each 4×4 sub-block to indicate whether or not there is a non-zero coefficient in a current sub-block.

If the value of coded_sub_block_flag is 0, there is no more information to be transmitted, and therefore, the encoding process for the current sub-block may be terminated. Conversely, if the value of coded_sub_block_flag is 1, the encoding process for sig_coeff_flag may continue to be performed. Since the sub-block including the last non-zero coefficient does not require encoding of coded_sub_block_flag, and the sub-block including the DC information of the transform block has a high probability of including the non-zero coefficient, coded_sub_block_flag may be assumed to have a value of 1 without being encoded.

If it is determined that a non-zero coefficient exists in the current sub-block because the value of coded_sub_block_flag is 1, then, inversely, sig_coeff_flag having a binary value may be encoded according to the scan order. A 1-bit syntax element sig_coeff_flag may be encoded for each coefficient according to the scan order. If the value of the transform coefficient at the current scan position is not 0, the value of sig_coeff_flag may be 1. Here, in the case of a sub-block including the last non-zero coefficient, since sig_coeff flag is not required to be encoded for the last non-zero coefficient, the encoding process for sig_coeff_flag may be omitted. Only when sig_coeff_flag is 1, level information encoding may be performed, and four syntax elements may be used in the level information encoding process. More specifically, each sig_coeff_flag[xC][yC] may indicate whether or not the level (value) of the corresponding transform coefficient at each transform coefficient position (xC, yC) in the current TB is non-zero. In an embodiment, the sig_coeff_flag may correspond to an example of a significant coefficient flag indicating whether or not a quantized transform coefficient is a non-zero effective coefficient.

The level value remaining after the encoding for sig_coeff flag may be the same as in Equation 1 below. That is, the syntax element remAbsLevel indicating the level value to be encoded may be as shown in Equation 1 below. Here, coeff means an actual transform coefficient value.

$$remAbsLevel=|coeff|-1 \qquad \text{[Equation 1]}$$

Through par_level_flag, the least significant coefficient (LSB) value of remAbsLevel written in Equation 1 may be encoded as shown in Equation 2 below. Here, par_level_flag [n] may indicate a parity of a transform coefficient level (value) at a scanning position n. After par_leve_flag encoding, a transform coefficient level value remAbsLevel to be encoded may be updated as shown in Equation 3 below.

$$par\_level\_flag=remAbsLevel \,\&\, 1 \qquad \text{[Equation 2]}$$

$$remAbsLevel'=remAbsLevel>>1 \qquad \text{[Equation 3]}$$

rem_abs_gt1_flag may indicate whether or not remAbsLevel' at the corresponding scanning position n is greater than 1, and rem_abs_gt2_flag may indicate whether or not remAbsLevel' at the corresponding scanning position n is greater than 2. Encoding for abs_remainder may be performed only when rem_abs_gt2_flag is 1. When the relationship between the actual transform coefficient value coeff and each syntax element is summarized, it may be, for example, as in Equation 4 below, and Table 2 below shows examples related to Equation 4. In addition, the sign of each coefficient may be encoded using a 1-bit symbol coeff_sign_flag. |coeff| may indicate a transform coefficient level (value), and may be expressed as AbsLevel for a transform coefficient.

the abs_level_gtx_flag[n][0] may correspond to an example of the first transform coefficient level flag, and the abs_level_gtx_flag[n][1] may correspond to an example of the second transform coefficient level flag. The (j<<1)+1 may be replaced by a predetermined threshold value, such as a first threshold value and a second threshold value, according to circumstances.

TABLE 2

| [coeff] | sig_coeff_flag | par_level_flag | rem_abs_gt1_flag | rem_abs_gt2_flag | abs_remainder |
|---|---|---|---|---|---|
| 0 | 0 | | | | |
| 1 | 1 | 0 | 0 | | |
| 2 | 1 | 1 | 0 | | |
| 3 | 1 | 0 | 1 | 0 | |
| 4 | 1 | 1 | 1 | 0 | |
| 5 | 1 | 0 | 1 | 1 | 0 |
| 6 | 1 | 1 | 1 | 1 | 0 |
| 7 | 1 | 0 | 1 | 1 | 1 |
| 8 | 1 | 1 | 1 | 1 | 1 |
| 9 | 1 | 0 | 1 | 1 | 2 |
| 10 | 1 | 1 | 1 | 1 | 2 |
| 11 | 1 | 0 | 1 | 1 | 3 |
| ... | ... | ... | ... | ... | ... |

$$|coeff| = sig\_coeff\_flag + par\_level\_flag + 2 * (rem\_abs\_gt1\_flag + rem\_abs\_gt2\_flag + abs\_remainder) \quad [\text{Equation 4}]$$

In an embodiment, the par_level_flag indicates an example of a parity level flag for parity of a transform coefficient level for the quantized transform coefficient, the rem_abs_gt1_flag indicates an example of a first transform coefficient level flag for whether or not the transform coefficient level is greater than a first threshold value, and the rem_abs_gt2_flag may indicate an example of a second transform coefficient level flag for whether or not the transform coefficient level is greater than a second threshold value.

Figure 5:
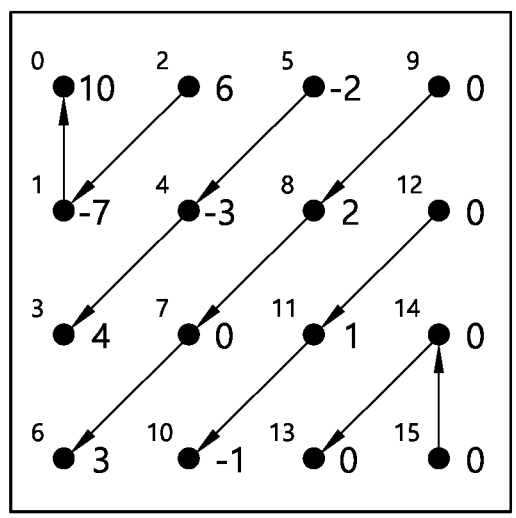
FIG. 5 is a diagram illustrating an example of transform coefficients in a 4×4 block.

FIG. 5 is a diagram illustrating an example of transform coefficients in a 4×4 block.

The 4×4 block of FIG. 5 shows an example of quantized coefficients. The block illustrated in FIG. 7 may be a 4×4 transform block, or a 4×4 sub-block of an 8×8, 16×16, 32×32, or 64×64 transform block. The 4×4 block of FIG. 5 may be a luma block or a chroma block. The encoding result for the inverse diagonally scanned coefficients of FIG. 5 may be, for example, shown in Table 3. In Table 3, scan_pos indicates the position of the coefficient according to the inverse diagonal scan. scan_pos 15 is a coefficient which is scanned first in the 4×4 block, that is, a coefficient at a bottom-right corner, and scan_pos 0 is a coefficient which is scanned last, that is, a coefficient at a top-left corner. Meanwhile, in one embodiment, the scan_pos may be referred to as a scan position. For example, the scan_pos 0 may be referred to as scan position 0.

TABLE 3

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | 0 | 1 |
| rem_abs_gt1_flag | | | | | 0 | 0 | | 0 | | 1 | 0 | 1 | 1 | 1 | 1 | 1 |
| rem_abs_gt2_flag | | | | | | | | | | 0 | | 0 | 0 | 1 | 1 | 1 |
| abs_remainder | | | | | | | | | | | | | | 0 | 1 | 2 |
| ceoff_sign_flag | | | | | 0 | 1 | | 0 | | 0 | 1 | 1 | 0 | 0 | 1 | 0 |

In addition, in another embodiment, rem_abs_gt2_flag may be referred to as rem_abs_gt3_flag, and in another embodiment, rem_abs_gt1_flag and rem_abs_gt2_flag may be represented based on abs_level_gtx_flag[n][j]. abs_level_gtx_flag[n][j] may be a flag indicating whether or not the absolute value of the transform coefficient level at the scanning position n (or the transform coefficient level shifted by 1 to the right) is greater than (j<<1)+1. In one example, the rem_absgt1_flag may perform a function which is the same and/or similar function to abs_level_gtx_flag[n][0], and the rem_abs_gt2_flag may perform a function which is the same and/or similar to abs_level_gtx_flag [n][1]. That is, Meanwhile, as described with reference to Table 1, prior to encoding the residual signal and the special residual signal, whether or not to apply the transform of the corresponding block is first transmitted. By expressing the correlation between the residual signals in the transform domain, compaction of data is achieved and transmitted to the decoding apparatus. If the correlation between the residual signals is insufficient, data compaction may not occur sufficiently. In this case, a conversion process including a complex calculation process may be omitted, and a residual signal in the pixel domain (spatial domain) may be transferred to the decoding apparatus.

Since the residual signal of the pixel domain that has not been subjected to transform has different characteristics (the distribution of the residual signal, the absolute level of each residual signal, etc.) from the residual signal of the general transformation domain, a residual signal encoding method for efficiently transmitting such a signal to a decoding apparatus according to an example of the present disclosure will be proposed hereinafter.

Figure 6:
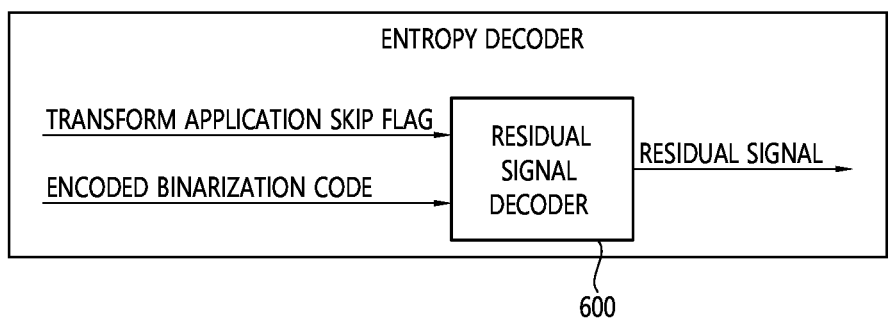
FIG. 6 is a diagram illustrating a residual signal decoder according to an example of the present document.

FIG. 6 is a diagram illustrating a residual signal decoder according to an example of the present document.

As illustrated, a transformation application flag indicating whether or not a transform is applied to a corresponding transform block and information on the encoded binarization code may be input to the residual signal decoder 600, and a decoded residual signal may be output from the residual signal decoder 600.

A flag for whether or not to apply a transform may be expressed as transform_skip_flag, and the encoded binarization code may be input to the residual signal decoder 600 through the binarization process.

The residual signal decoder 600 may be included in the entropy decoder of the decoding apparatus. While the transform application skip flag and the bitstream are separately illustrated in FIG. 6 for the sake of explanation, the transform application skip flag may be included in the bitstream. That is, the bitstream may include information on transform coefficients (transform_skip_flag=0 when transform is applied) or information on a residual sample (its value) (transform_skip_flag=1 when transform is not applied) as well as the transform application skip flag. The information on the transform coefficients may include information (syntax elements) disclosed in above Table 1.

The transform skip flag is transmitted in units of transform blocks, and the transform block may correspond to the coding block, or the transform block may be located inside the coding block. In Table 1 the flag for whether or not to transform is limited to a specific block size (a condition of parsing the transform skip flag is included only when the transform block size is 4×4 or less). However, in the present embodiment, the size of a block for determining whether or not to parse the transform skip flag may be variously configured. The sizes of Log 2TbWidth and log 2TbHeight may be determined as variables wN and hN, and the wN and the hN may be selected as one of the following:

$$wN=\{2,3,4,5\}$$

$$wH=\{2,3,4,5\} \quad \text{[Equation 5]}$$

A syntax element to which Equation 5 may be applied is as follows.

TABLE 4 if( transform_skip_enabled_flag &&
( cIdx ! = 0 ]] cu_mts_flag[ x0 ][ y0 ] = = 0 ) &&
    ( log2TbWidth < = wN ) && ( log2TbHeight <= hN ))
        transform_skip_flag[ x0 ][ y0 ][ cIdx ]        ae(v)

As described above, a method of decoding the residual signal may be determined according to the transform skip flag. Through the proposed method, it is possible to reduce the complexity in the entropy decoding process and improve the encoding efficiency by efficiently processing signals having different statistical characteristics from each other.

According to an example, when encoding an image, a coding unit may be determined as a block, and similar regions may be partitioned into a square or rectangular block. In this case, it is assumed that the luma component (luma component) and the chroma component (chroma component) are similar, and in the chroma component, the block partition structure of the already encoded luma component may be used. On the other hand, even if the chroma component follows a block structure different from the block of the luma component, encoding information of an image may be effectively delivered because the chroma component has relatively fewer complex regions than the luma component.

Meanwhile, after performing the prediction, a residual signal generated through difference from the original is subjected to the transform and the quantization. For regions where a large amount of residuals are generated, compression without significant degradation of the decoded image may be expected by omitting or reducing information of a high-frequency region that is not easily recognized by the human eye through the transform and quantization processes.

However, when encoding the chroma component, since there are not many complex textures as described above, the prediction accuracy is higher than that of the luma component, and relatively small amount of the energy of the residual information may occur. In this case, there is no significant difference between applying and not applying the transform, and rather, signaling a flag related to whether or not to transform to all transform blocks may act as an overhead.

Accordingly, an embodiment of the present document proposes a method of transmitting a transform skip flag depending on whether a chroma component has a dual tree or separate tree structure in which the chroma component does not follow a complex block partition structure of a luma component.

Figure 7:
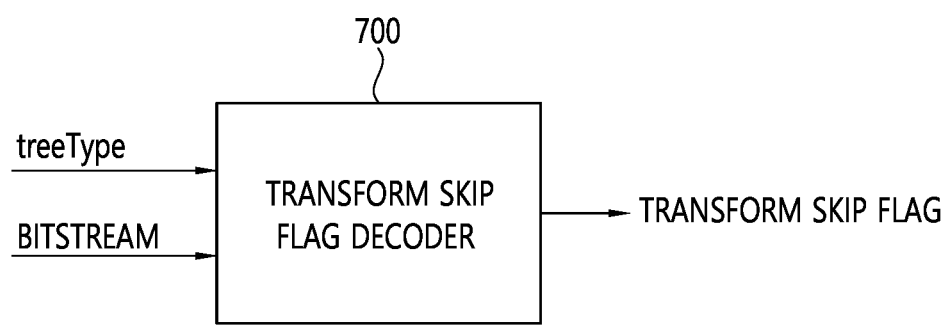
FIG. 7 shows a transform skip flag decoder according to an embodiment of the present document.
Figure 8:
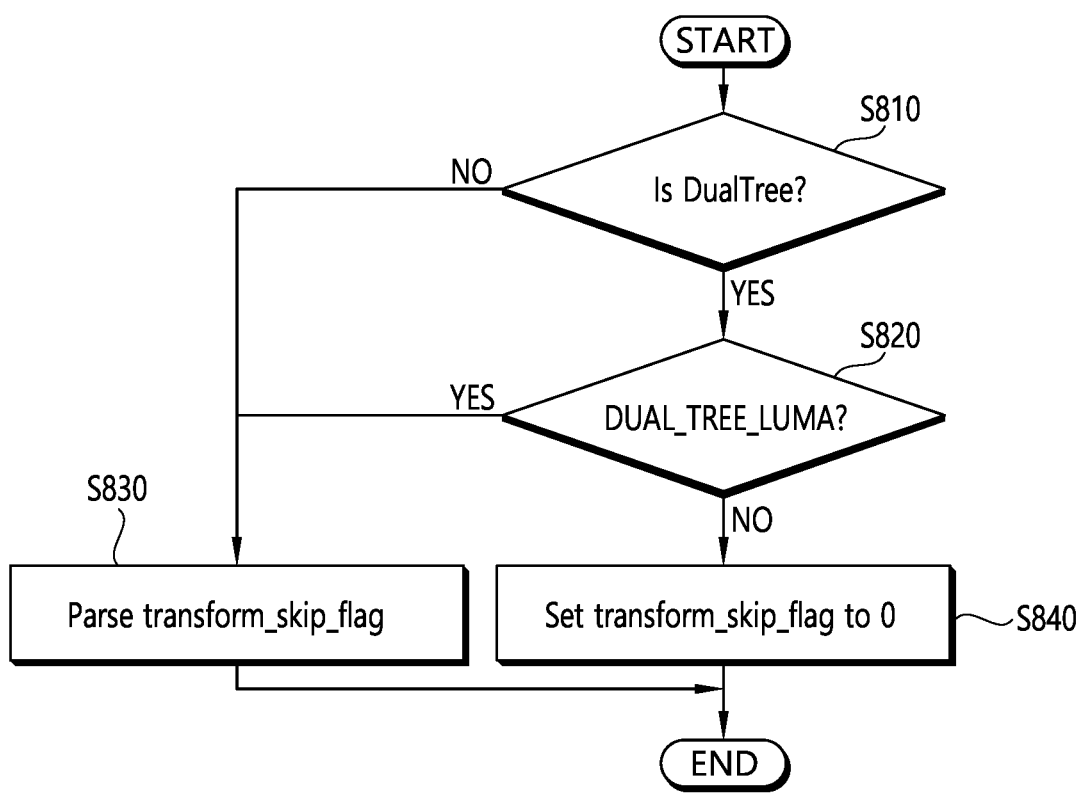
FIG. 8 is a control flowchart illustrating a method of decoding a transform skip flag according to the transform skip flag decoder of FIG. 7.

FIG. 7 shows a transform skip flag decoder according to an embodiment of the present document. FIG. 8 is a control flowchart illustrating a method of decoding a transform skip flag according to the transform skip flag decoder of FIG. 7.

The transform skip flag decoder 700 of FIG. 7 may be included in an entropy decoder of a decoding apparatus. As illustrated, a bitstream and information on a tree type (treeType) may be input to the transform skip flag decoder 700, and different transform skip flags may be output depending on the tree type. Information on the tree type may be input with the information being included in the bitstream.

Meanwhile, in the case that the signals input and output to the transform skip flag decoder 700 are reversed to each other, and a reverse process of the process performed by the transform skip flag decoder 700 is performed, a transform skip flag encoder of an encoding apparatus may be implemented.

The tree type (treeType) may be classified into a single tree (INGLE_TREE) or a dual tree (DUAL_TREE) depending on whether or not a luma component block and a corresponding chroma component block have separate partition structures. In the case that the chroma component block has the same partition structure as the luma component block, it may be represented as a single tree, and in the case that the chroma component block has a different partition structure from the luma component block, it may be represented as a dual tree. In the case that the dual tree is applied, the tree type may further indicate whether DUAL_TREE_LUMA or DUAL_TREE_CHROMA is applied.

Based on the condition shown in FIG. 8, the encoding apparatus may generate and encode residual related information (transform_skip_flag and the like), and the decoding apparatus may parse and decode the residual related information.

As shown in FIG. 8, first, it may be determined whether or not a dual tree is applied to the current block (S810).

As a result of the determination, when the dual tree is applied to the current block, it may be further determined whether or not DUAL_TREE_LUMA is applied to the current block (S820).

In the case that the dual tree is not applied, or that the dual tree is applied and DUAL_TREE_LUMA is applied, flag information related to whether or not transform skip is applied to the current block, that is, transform_skip_flag, is parsed (S830), and subsequently, the residual signal will be decoded according to the parsing result.

Contrarily, in the case that DUAL_TREE_LUMA is not applied to the current block, that is, DUAL_TREE_CHROMA is applied, the value of transform_skip_flag may be set to 0 without being parsed (S840). In this case, transform_skip_flag may not be signaled from the encoding apparatus and parsing thereof may be omitted in the decoding apparatus.

That is, in the case that the dual tree is applied to the current block and DUAL_TREE_LUMA is not applied, that is, DUAL_TREE_CHROMA is applied, transform_skip_flag of Table 1 may not exist. In the case that transform_skip_flag does not exist, the decoding apparatus may regard the value of transform_skip_flag as 0. In this case, since a coded bit for transform_skip_flag may not exist for the current block, compression efficiency can be improved.

Meanwhile, after performing the prediction, a residual signal generated through difference from the original is subjected to the transform and the quantization. For regions where a large amount of residuals are generated, compression without significant degradation of the decoded image may be expected by omitting or reducing information of a high-frequency region that is not easily recognized by the human eye through the transform and quantization processes.

However, when encoding the chroma component, since there are not many complex textures as described above, the prediction accuracy is higher than that of the luma component, and relatively small amount of the energy of the residual information may occur. In this case, there is no significant difference between applying and not applying the transform, and rather, signaling a flag related to whether or not to transform to all transform blocks may act as an overhead.

Accordingly, an embodiment of the present document proposes a method of transmitting a transform skip flag depending on a component of a current block, that is, whether the current block is a luma component block or a chroma component block.

Figure 9:
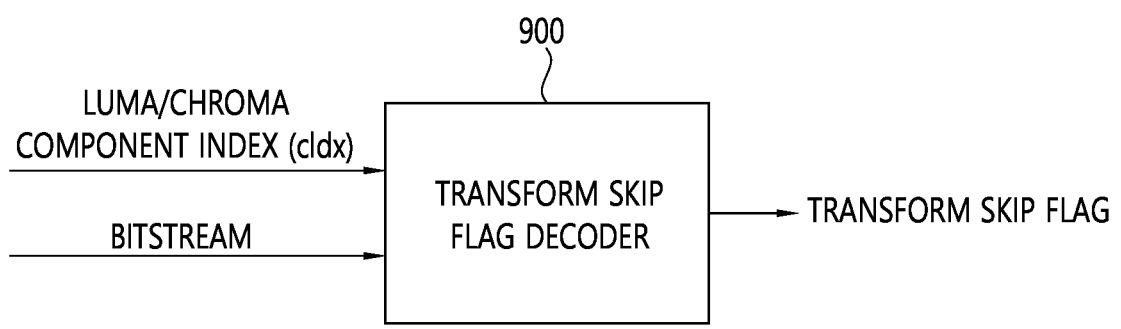
FIG. 9 shows a transform skip flag decoder according to another embodiment of the present document.
Figure 10:
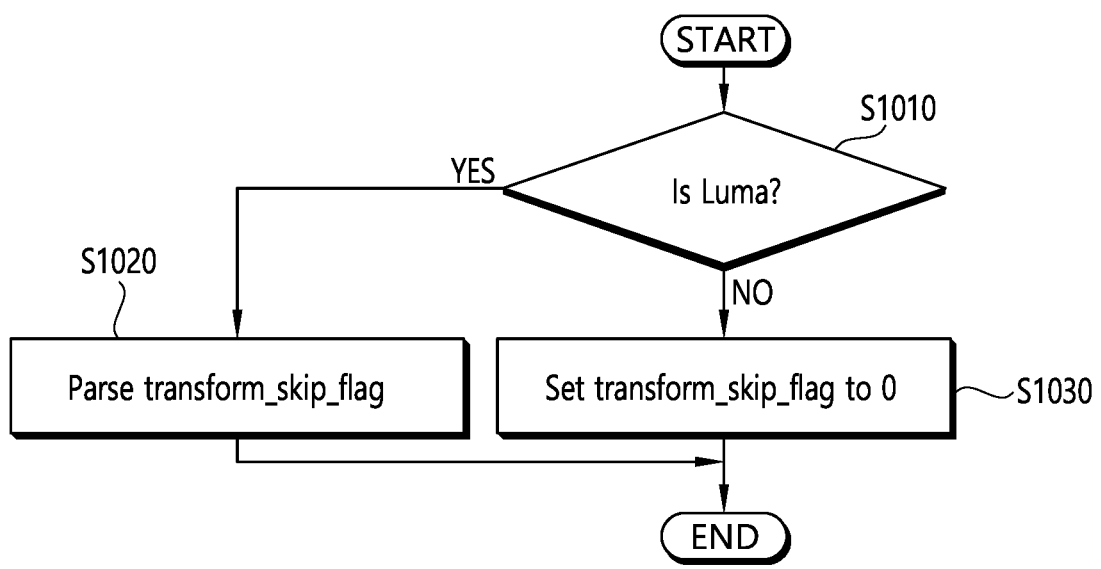
FIG. 10 is a control flowchart illustrating a method of decoding a transform skip flag according to the transform skip flag decoder of FIG. 9.

FIG. 9 shows a transform skip flag decoder according to another embodiment of the present document, and FIG. 10 is a control flowchart illustrating a method of decoding a transform skip flag according to the transform skip flag decoder of FIG. 9.

The transform skip flag decoder 900 of FIG. 9 may be included in an entropy decoder of a decoding apparatus. As illustrated, a bitstream and information on the luma/chroma component index (cIdx) may be input to the transform skip flag decoder 900, and different transform skip flags may be output depending on the luma/chroma component index. Information on the luma/chroma component index may be input with the information being included in the bitstream.

Meanwhile, in the case that the signals input and output to the transform skip flag decoder 900 are reversed to each other, and a reverse process of the process performed by the transform skip flag decoder 900 is performed, a transform skip flag encoder of an encoding apparatus may be implemented.

The luma/chroma component index cIdx of 0 may represent a luma component, the cIdx of 1 may represent Cb of a chroma component, and the cIdx of 2 represent Cr of a chroma component.

Based on the condition shown in FIG. 10, the encoding apparatus may generate and encode residual related information (transform_skip_flag and the like), and the decoding apparatus may parse and decode the residual related information.

As shown in FIG. 10, first, it may be determined whether or not the current block is a luma component (S1010).

As a result of the determination, in the case that the current block is a luma component, flag information related to whether or not transform skip is applied to the current block, that is, transform_skip_flag, is parsed (S1020), and subsequently, the residual signal will be decoded according to the parsing result.

Contrarily, in the case that the current block is not a luma component but a chroma component, a value of transform_skip_flag for the chroma component may be set to 0 (S1030). In this case, transform_skip_flag may not be signaled from the encoding apparatus and parsing thereof may be omitted in the decoding apparatus.

That is, transform_skip_flag of Table 1 may not exist for the chroma component. In the case that transform_skip_flag does not exist, the decoding apparatus may regard the value of transform_skip_flag as 0. In this case, since a coded bit for transform_skip_flag may not exist for the current block, compression efficiency can be improved.

Meanwhile, after performing the prediction, a residual signal generated through difference from the original is subjected to the transform and the quantization. For regions where a large amount of residuals are generated, compression without significant degradation of the decoded image may be expected by omitting or reducing information of a high-frequency region that is not easily recognized by the human eye through the transform and quantization processes.

However, when encoding the chroma component, since there are not many complex textures as described above, the prediction accuracy is higher than that of the luma component, and relatively small amount of the energy of the residual information may occur. In this case, there is no significant difference between applying and not applying the transform, and rather, signaling a flag related to whether or not to transform to all transform blocks may act as an overhead.

Accordingly, an embodiment of the present document proposes a method of transmitting a transform skip flag depending on whether a chroma component has a dual tree or separate tree structure in which the chroma component does not follow a complex block partition structure of a luma component. In addition, in the present embodiment, a transform skip flag may be used in the luma component information of the position corresponding to the currently decoded chroma component, for example, of the top-left.

Figure 11:
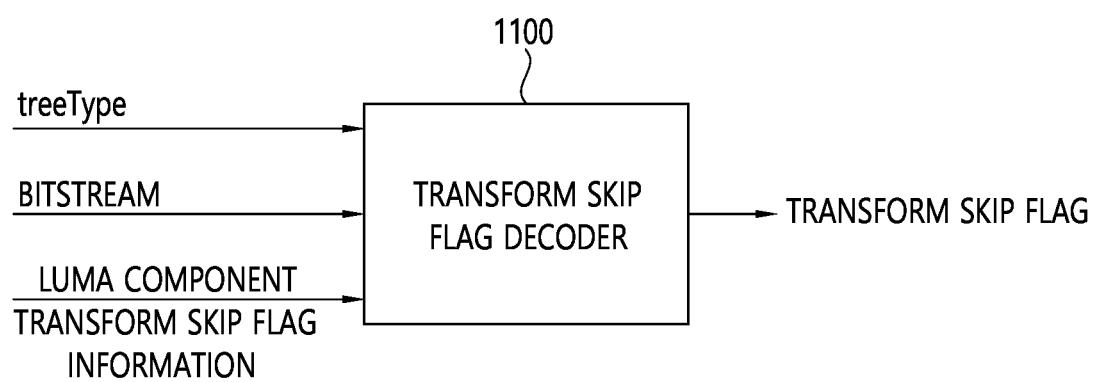
FIG. 11 shows a transform skip flag decoder according to another embodiment of the present document.
Figure 12:
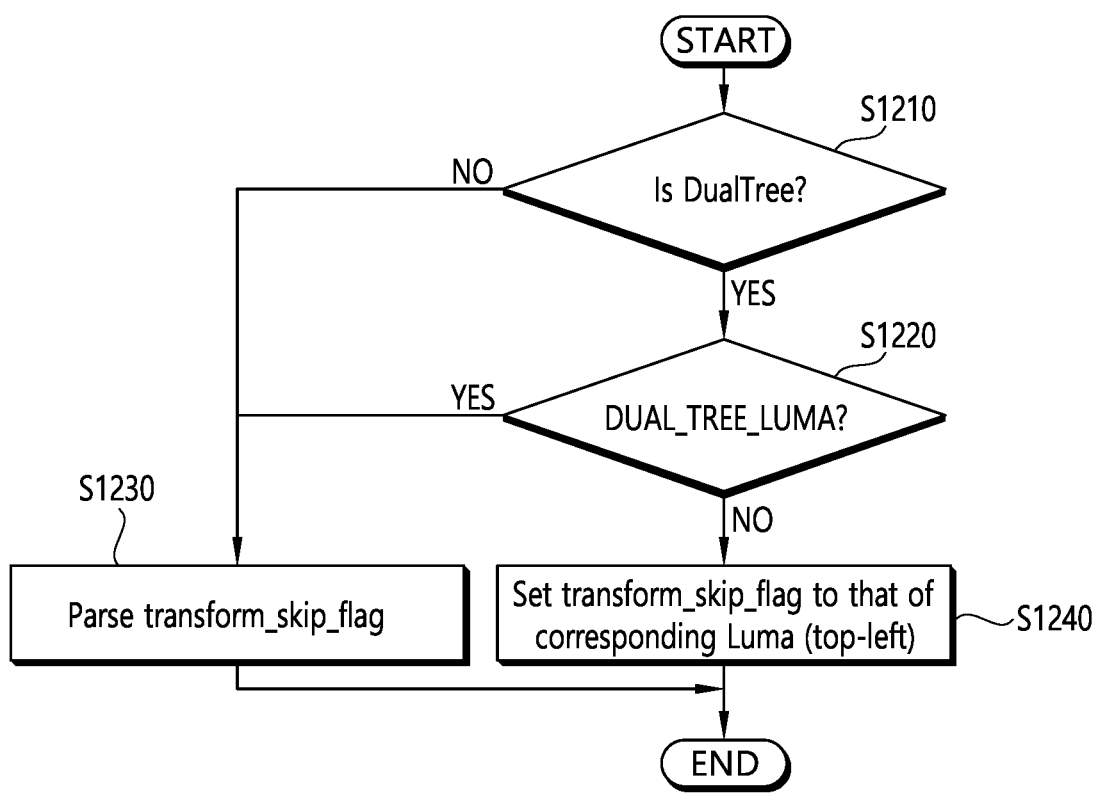
FIG. 12 is a control flowchart illustrating a method of decoding a transform skip flag according to the transform skip flag decoder of FIG. 11.

FIG. 11 shows a transform skip flag decoder according to another embodiment of the present document, and FIG. 12 is a control flowchart illustrating a method of decoding a transform skip flag according to the transform skip flag decoder of FIG. 11.

The transform skip flag decoder 1100 of FIG. 11 may be included in an entropy decoder of a decoding apparatus. As illustrated, a bitstream, luma component transform skip flag information (transform_skip_flag for luma component), and information on a tree type (treeType) may be input to the transform skip flag decoder 1100, and different transform skip flags may be output depending on the tree type and the luma component transform skip flag information. Tree type and luma component transform skip flag information may be input with the tree type and the luma component transform skip flag information being included in the bitstream.

Meanwhile, in the case that the signals input and output to the transform skip flag decoder 1100 are reversed to each other, and a reverse process of the process performed by the transform skip flag decoder 1100 is performed, a transform skip flag encoder of an encoding apparatus may be implemented.

The tree type (treeType) may be classified into a single tree (INGLE_TREE) or a dual tree (DUAL_TREE) depending on whether or not a luma component block and a corresponding chroma component block have separate partition structures. In the case that the chroma component block has the same partition structure as the luma component block, it may be represented as a single tree, and in the case that the chroma component block has a different partition structure from the luma component block, it may be represented as a dual tree. In the case that the dual tree is applied, the tree type may further indicate whether DUAL_TREE_LUMA or DUAL_TREE_CHROMA is applied.

Based on the condition as shown in FIG. 12, the encoding apparatus may generate and encode residual related information (transform_skip_flag and the like), and the decoding apparatus may parse and decode the residual related information.

As shown in FIG. 12, first, it may be determined whether or not a dual tree is applied to the current block (S1210).

As a result of the determination, when the dual tree is applied to the current block, it may be further determined whether or not DUAL_TREE_LUMA is applied to the current block (S1220).

In the case that the dual tree is not applied, or that the dual tree is applied and DUAL_TREE_LUMA is applied, flag information related to whether or not transform skip is applied to the current block, that is, transform_skip_flag, is parsed (S1230), and subsequently, the residual signal will be decoded according to the parsing result.

Contrarily, in the case that DUAL_TREE_LUMA is not applied to the current block, that is, DUAL_TREE_CHROMA is applied, a value of transform_skip_flag for a chroma component is not parsed, and may be set based on information of a luma component block at a position corresponding to a reference position (top-left) of the currently decoded chroma component block (S1240).

For example, the value of transform_skip_flag for the chroma component may be set to the same as the value of transform_skip_flag for the luma component block at a position corresponding to the top-left position of the currently decoded chroma component block. In this case, transform_skip_flag for the chroma component may not exist in the bitstream and/or Table 1. In this case, a coded bit for transform_skip_flag for the chroma component may not exist, and thus, compression efficiency may be improved.

Meanwhile, after performing the prediction, a residual signal generated through difference from the original is subjected to the transform and the quantization. For regions where a large amount of residuals are generated, compression without significant degradation of the decoded image may be expected by omitting or reducing information of a high-frequency region that is not easily recognized by the human eye through the transform and quantization processes.

However, when encoding the chroma component, since there are not many complex textures as described above, the prediction accuracy is higher than that of the luma component, and relatively small amount of the energy of the residual information may occur. In this case, there is no significant difference between applying and not applying the transform, and rather, signaling a flag related to whether or not to transform to all transform blocks may act as an overhead.

Accordingly, an embodiment of the present document proposes a method of transmitting a transform skip flag depending on whether a chroma component has a dual tree or separate tree structure in which the chroma component does not follow a complex block partition structure of a luma component. In addition, in the present embodiment, a transform skip flag may be used in the luma component information of the position corresponding to the currently decoded chroma component, for example, of the center.

Figure 13:
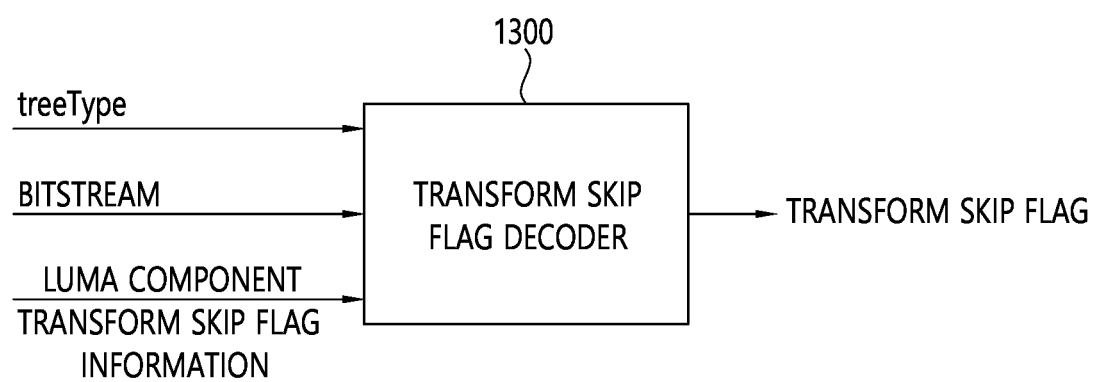
FIG. 13 shows a transform skip flag decoder according to another embodiment of the present document.
Figure 14:
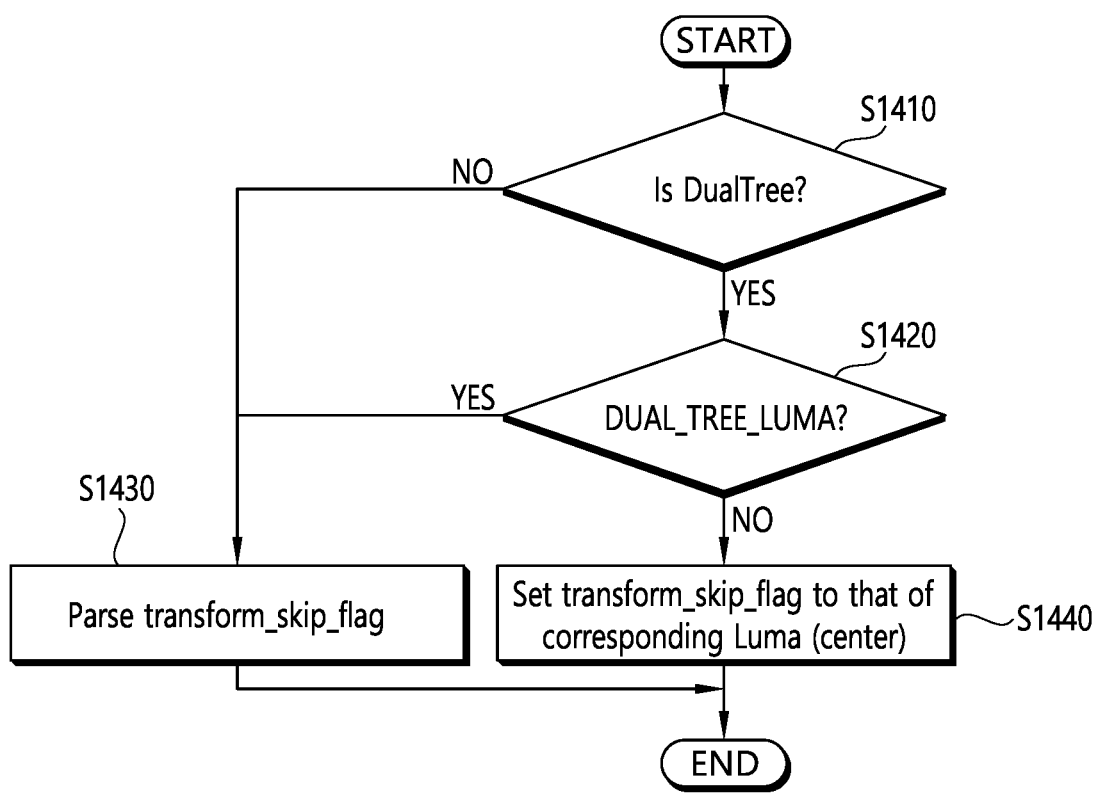
FIG. 14 is a control flowchart illustrating a method of decoding a transform skip flag according to the transform skip flag decoder of FIG. 13.

FIG. 13 shows a transform skip flag decoder according to another embodiment of the present document, and FIG. 14 is a control flowchart illustrating a method of decoding a transform skip flag according to the transform skip flag decoder of FIG. 13.

The transform skip flag decoder 1300 of FIG. 13 may be included in an entropy decoder of a decoding apparatus. As illustrated, a bitstream, luma component transform skip flag information (transform_skip_flag for luma component), and information on a tree type (treeType) may be input to the transform skip flag decoder 1300, and different transform skip flags may be output depending on the tree type and the luma component transform skip flag information. Tree type and luma component transform skip flag information may be input with the tree type and the luma component transform skip flag information being included in the bitstream.

Meanwhile, in the case that the signals input and output to the transform skip flag decoder 1300 are reversed to each other, and a reverse process of the process performed by the transform skip flag decoder 1300 is performed, a transform skip flag encoder of an encoding apparatus may be implemented.

The tree type (treeType) may be classified into a single tree (INGLE_TREE) or a dual tree (DUAL_TREE) depending on whether or not a luma component block and a corresponding chroma component block have separate partition structures. In the case that the chroma component block has the same partition structure as the luma component block, it may be represented as a single tree, and in the case that the chroma component block has a different partition structure from the luma component block, it may be represented as a dual tree. In the case that the dual tree is applied, the tree type may further indicate whether DUAL_TREE_LUMA or DUAL_TREE_CHROMA is applied.

Based on the condition as shown in FIG. 14, the encoding apparatus may generate and encode residual related information (transform_skip_flag and the like), and the decoding apparatus may parse and decode the residual related information.

As shown in FIG. 14, first, it may be determined whether or not a dual tree is applied to the current block (S1410).

As a result of the determination, when the dual tree is applied to the current block, it may be further determined whether or not DUAL_TREE_LUMA is applied to the current block (S1420).

In the case that the dual tree is not applied, or that the dual tree is applied and DUAL_TREE_LUMA is applied, flag information related to whether or not transform skip is applied to the current block, that is, transform_skip_flag, is parsed (S1430), and subsequently, the residual signal will be decoded according to the parsing result.

Contrarily, in the case that DUAL_TREE_LUMA is not applied to the current block, that is, DUAL_TREE_CHROMA is applied, a value of transform_skip_flag for a chroma component is not parsed, and may be set based on information of a luma component block at a position corresponding to a reference position (center) of the currently decoded chroma component block (S1440).

For example, the value of transform_skip_flag for the chroma component may be set to the same as the value of transform_skip_flag for the luma component block at a position corresponding to the center position of the currently decoded chroma component block. Here, the center position may indicate a bottom-right sample position among four samples located at the center of a corresponding block. In this case, transform_skip_flag for the chroma component may not exist in the bitstream and/or Table 1. In this case, a coded bit for transform_skip_flag for the chroma component may not exist, and thus, compression efficiency may be improved.

Meanwhile, after performing the prediction, a residual signal generated through difference from the original is subjected to the transform and the quantization. For regions where a large amount of residuals are generated, compression without significant degradation of the decoded image may be expected by omitting or reducing information of a high-frequency region that is not easily recognized by the human eye through the transform and quantization processes.

However, when encoding the chroma component, since there are not many complex textures as described above, the prediction accuracy is higher than that of the luma component, and relatively small amount of the energy of the residual information may occur. In this case, there is no significant difference between applying and not applying the transform, and rather, signaling a flag related to whether or not to transform to all transform blocks may act as an overhead.

Accordingly, an embodiment of the present document proposes a method of transmitting a transform skip flag depending on a component of a current block, that is, whether the current block is a luma component block or a chroma component block. In addition, in the present embodiment, a transform skip flag may be used in the luma component information of the position corresponding to the currently decoded chroma component, for example, of the top-left.

Figure 15:
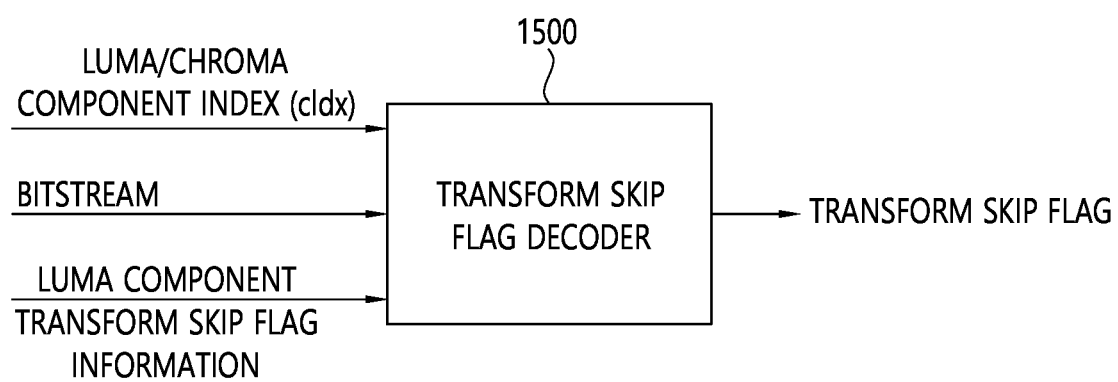
FIG. 15 shows a transform skip flag decoder according to another embodiment of the present document.
Figure 16:
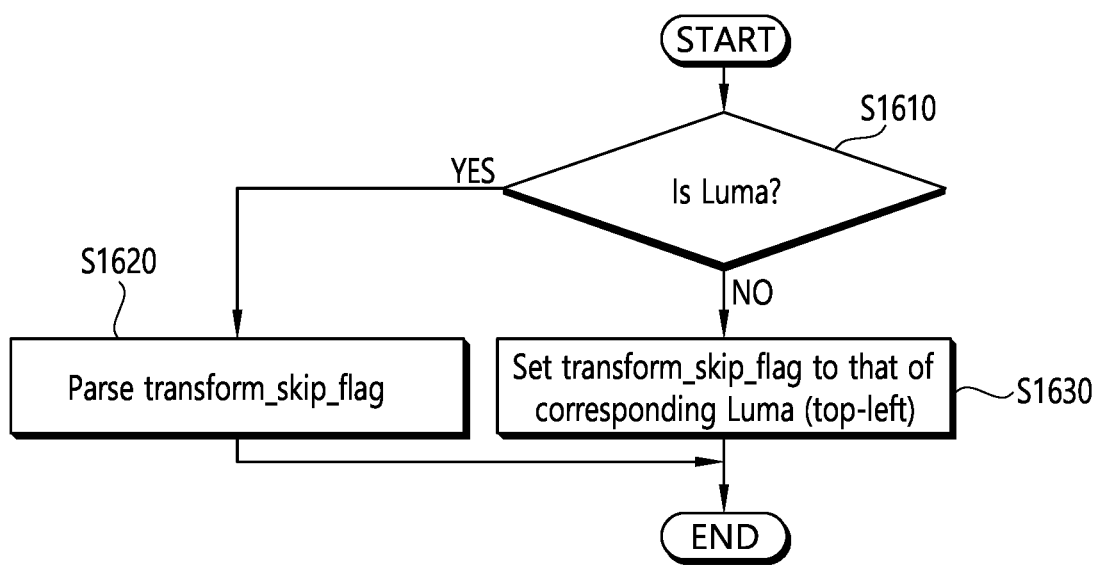
FIG. 16 is a control flowchart illustrating a method of decoding a transform skip flag according to the transform skip flag decoder of FIG. 15.

FIG. 15 shows a transform skip flag decoder according to another embodiment of the present document, and FIG. 16 is a control flowchart illustrating a method of decoding a transform skip flag according to the transform skip flag decoder of FIG. 15.

The transform skip flag decoder 1500 of FIG. 15 may be included in an entropy decoder of a decoding apparatus. As illustrated, a bitstream, luma component transform skip flag information (transform_skip_flag for luma component), and Information on the luma/chroma component index (cIdx) may be input to the transform skip flag decoder 1500, and different transform skip flags may be output depending on the luma/chroma component index and the luma component transform skip flag information. The luma/chroma component index and luma component transform skip flag information may be input with the luma/chroma component index and the luma component transform skip flag information being included in the bitstream.

Meanwhile, in the case that the signals input and output to the transform skip flag decoder 1500 are reversed to each other, and a reverse process of the process performed by the transform skip flag decoder 1500 is performed, a transform skip flag encoder of an encoding apparatus may be implemented.

The luma/chroma component index cIdx of 0 may represent a luma component, the cIdx of 1 may represent Cb of a chroma component, and the cIdx of 2 represent Cr of a chroma component.

Based on the condition shown in FIG. 16, the encoding apparatus may generate and encode residual related information (transform_skip_flag and the like), and the decoding apparatus may parse and decode the residual related information.

As shown in FIG. 16, first, it may be determined whether or not the current block is a luma component (S1610).

As a result of the determination, in the case that the current block is a luma component, flag information related to whether or not transform skip is applied to the current block, that is, transform_skip_flag, is parsed (S1620), and subsequently, the residual signal will be decoded according to the parsing result.

Contrarily, in the case that the current block is not a luma component but a chroma component, a value of transform_skip_flag for a chroma component is not parsed, and may be set based on information of a luma component block at a position corresponding to a reference position (top-left) of the currently decoded chroma component block (S1630).

For example, the value of transform_skip_flag for the chroma component may be set to the same as the value of transform_skip_flag for the luma component block at a position corresponding to the top-left position of the currently decoded chroma component block. In this case, transform_skip_flag for the chroma component may not exist in the bitstream and/or Table 1. In this case, a coded bit for transform_skip_flag for the chroma component may not exist, and thus, compression efficiency may be improved.

Meanwhile, after performing the prediction, a residual signal generated through difference from the original is subjected to the transform and the quantization. For regions where a large amount of residuals are generated, compression without significant degradation of the decoded image may be expected by omitting or reducing information of a high-frequency region that is not easily recognized by the human eye through the transform and quantization processes.

However, when encoding the chroma component, since there are not many complex textures as described above, the prediction accuracy is higher than that of the luma component, and relatively small amount of the energy of the residual information may occur. In this case, there is no significant difference between applying and not applying the transform, and rather, signaling a flag related to whether or not to transform to all transform blocks may act as an overhead.

Accordingly, an embodiment of the present document proposes a method of transmitting a transform skip flag depending on a component of a current block, that is, whether the current block is a luma component block or a chroma component block. In addition, in the present embodiment, a transform skip flag may be used in the luma component information of the position corresponding to the currently decoded chroma component, for example, of the center.

Figure 17:
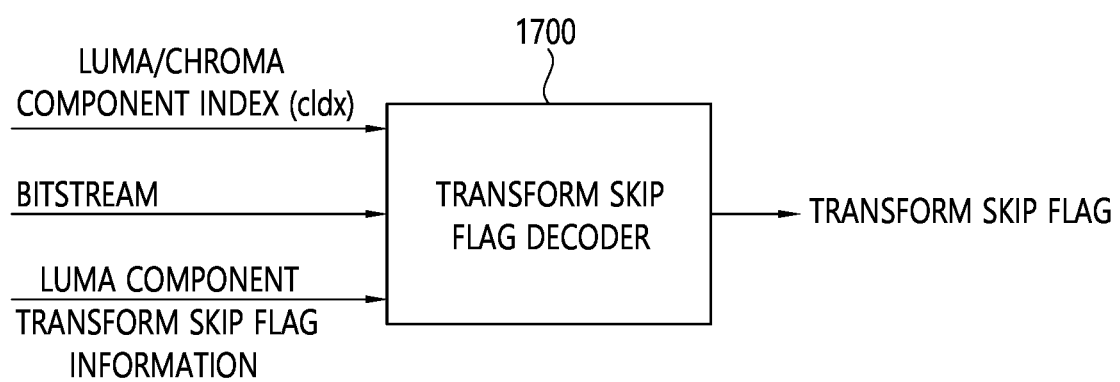
FIG. 17 shows a transform skip flag decoder according to another embodiment of the present document.
Figure 18:
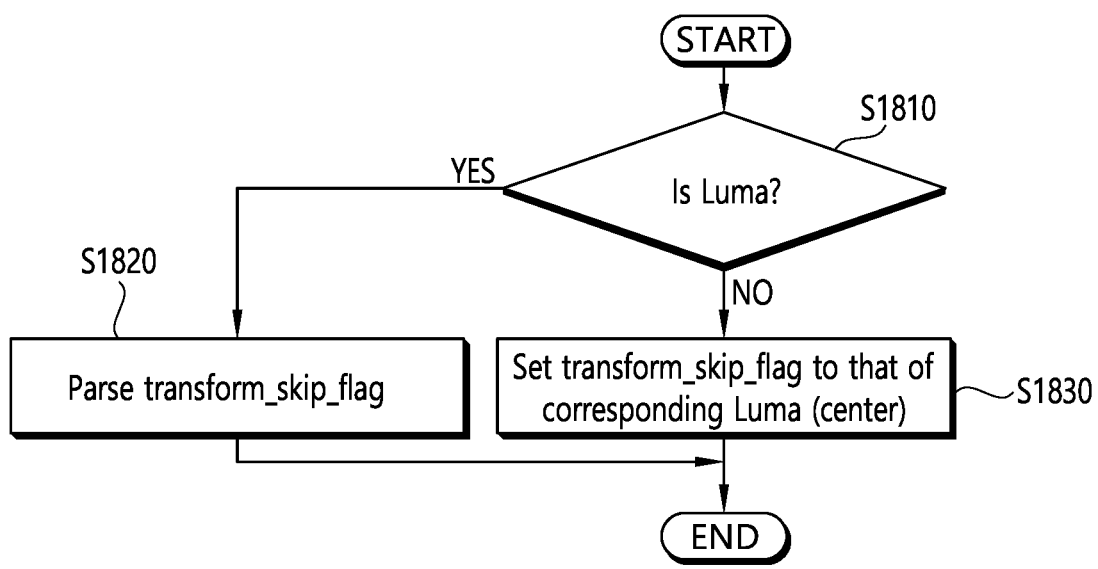
FIG. 18 is a control flowchart illustrating a method of decoding a transform skip flag according to the transform skip flag decoder of FIG. 17.

FIG. 17 shows a transform skip flag decoder according to another embodiment of the present document, and FIG. 18 is a control flowchart illustrating a method of decoding a transform skip flag according to the transform skip flag decoder of FIG. 17.

The transform skip flag decoder 1700 of FIG. 17 may be included in an entropy decoder of a decoding apparatus. As illustrated, a bitstream, luma component transform skip flag information (transform_skip_flag for luma component), and Information on the luma/chroma component index (cIdx) may be input to the transform skip flag decoder 1700, and different transform skip flags may be output depending on the luma/chroma component index and the luma component transform skip flag information. The luma/chroma component index and luma component transform skip flag information may be input with the luma/chroma component index and the luma component transform skip flag information being included in the bitstream.

Meanwhile, in the case that the signals input and output to the transform skip flag decoder 1700 are reversed to each other, and a reverse process of the process performed by the transform skip flag decoder 1700 is performed, a transform skip flag encoder of an encoding apparatus may be implemented.

The luma/chroma component index cIdx of 0 may represent a luma component, the cIdx of 1 may represent Cb of a chroma component, and the cIdx of 2 represent Cr of a chroma component.

Based on the condition shown in FIG. 18, the encoding apparatus may generate and encode residual related information (transform_skip_flag and the like), and the decoding apparatus may parse and decode the residual related information.

As shown in FIG. 18, first, it may be determined whether or not the current block is a luma component (S1810).

As a result of the determination, in the case that the current block is a luma component, flag information related to whether or not transform skip is applied to the current block, that is, transform_skip_flag, is parsed (S1820), and subsequently, the residual signal will be decoded according to the parsing result.

Contrarily, in the case that the current block is not a luma component but a chroma component, a value of transform_skip_flag for a chroma component is not parsed, and may be set based on information of a luma component block at a position corresponding to a reference position (center) of the currently decoded chroma component block (S1830).

For example, the value of transform_skip_flag for the chroma component may be set to the same as the value of transform_skip_flag for the luma component block at a position corresponding to the center position of the currently decoded chroma component block. Here, the center position may indicate a bottom-right sample position among four samples located at the center of a corresponding block. In this case, transform_skip_flag for the chroma component may not exist in the bitstream and/or Table 1. In this case, a coded bit for transform_skip_flag for the chroma component may not exist, and thus, compression efficiency may be improved.

Meanwhile, after performing the prediction, a residual signal generated through difference from the original is subjected to the transform and the quantization. For regions where a large amount of residuals are generated, compression without significant degradation of the decoded image may be expected by omitting or reducing information of a high-frequency region that is not easily recognized by the human eye through the transform and quantization processes.

However, when encoding the chroma component, since there are not many complex textures as described above, the prediction accuracy is higher than that of the luma component, and relatively small amount of the energy of the residual information may occur. In this case, there is no significant difference between applying and not applying the transform, and rather, signaling a flag related to whether or not to transform to all transform blocks may act as an overhead.

Accordingly, an embodiment of the present document proposes a method of transmitting a transform skip flag depending on a component of a current block, that is, whether the current block is a luma component block or a chroma component block.

Additionally, in the present embodiment, the transform_skip_flag syntax element of the luma component at a position corresponding to the currently decoded chroma component, for example, of the top-left is first checked, and transform_skip_flag of the chroma component to be decoded only when the transform_skip_flag of the luma component is 1 may be parsed. Contrarily, in the case that transform_skip_flag of the luma component is 0, the transform_skip_flag of the chroma component may be initialized to 0 without being parsed.

Figure 19:
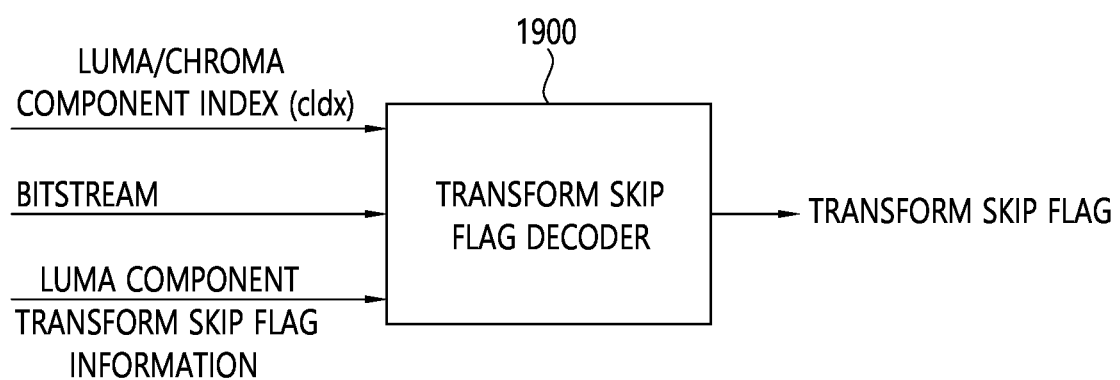
FIG. 19 shows a transform skip flag decoder according to another embodiment of the present document.
Figure 20:
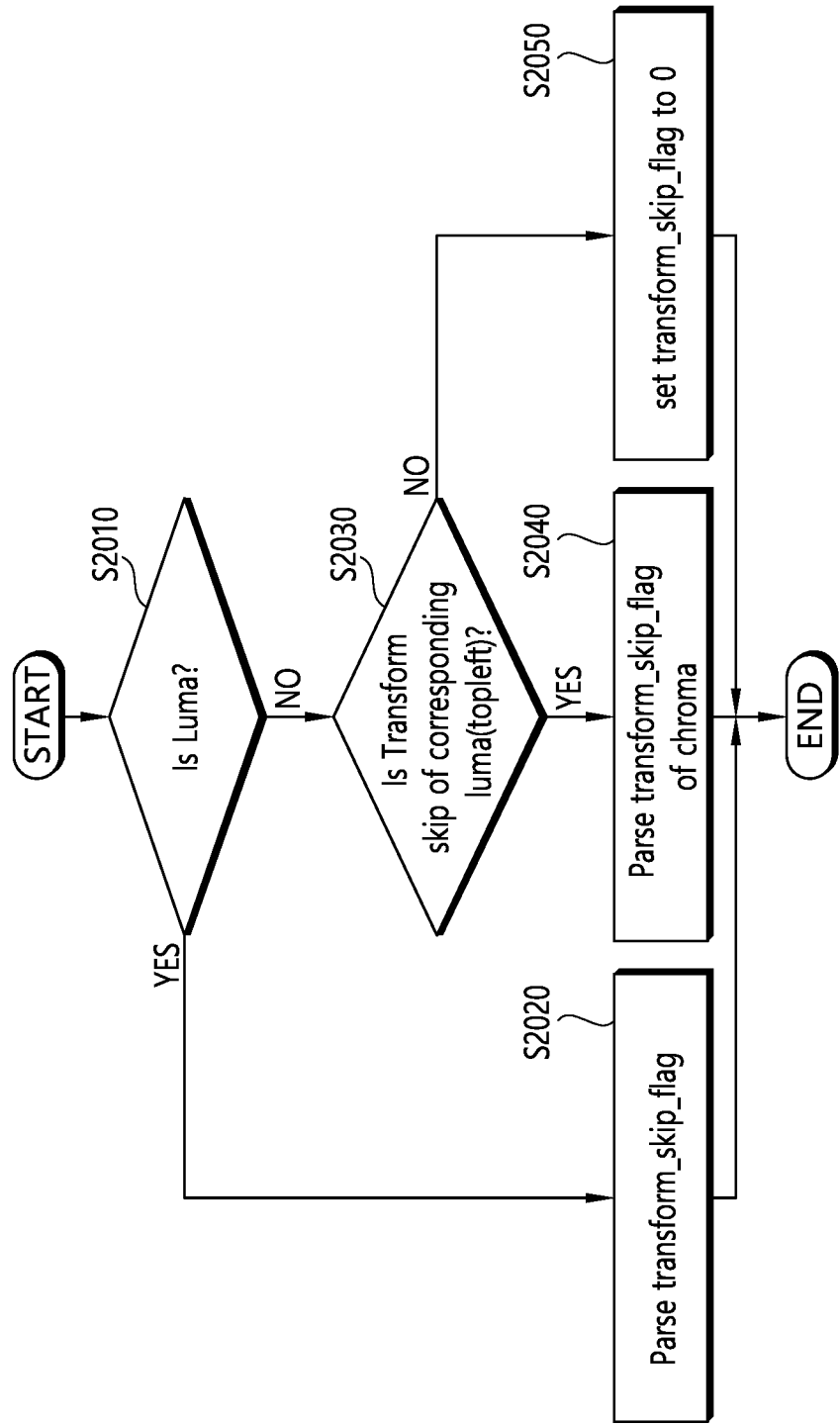
FIG. 20 is a control flowchart illustrating a method of decoding a transform skip flag according to the transform skip flag decoder of FIG. 19.

FIG. 19 shows a transform skip flag decoder according to another embodiment of the present document, and FIG. 20 is a control flowchart illustrating a method of decoding a transform skip flag according to the transform skip flag decoder of FIG. 19.

The transform skip flag decoder 1900 of FIG. 19 may be included in an entropy decoder of a decoding apparatus. As illustrated, a bitstream, luma component transform skip flag information (transform_skip_flag for luma component), and Information on the luma/chroma component index (cIdx) may be input to the transform skip flag decoder 1900, and different transform skip flags may be output depending on the luma/chroma component index and the luma component transform skip flag information. The luma/chroma component index and luma component transform skip flag information may be input with the luma/chroma component index and the luma component transform skip flag information being included in the bitstream.

Meanwhile, in the case that the signals input and output to the transform skip flag decoder 1900 are reversed to each other, and a reverse process of the process performed by the transform skip flag decoder 1900 is performed, a transform skip flag encoder of an encoding apparatus may be implemented.

The luma/chroma component index cIdx of 0 may represent a luma component, the cIdx of 1 may represent Cb of a chroma component, and the cIdx of 2 represent Cr of a chroma component.

Based on the condition shown in FIG. 20, the encoding apparatus may generate and encode residual related information (transform_skip_flag and the like), and the decoding apparatus may parse and decode the residual related information.

As shown in FIG. 20, first, it may be determined whether or not the current block is a luma component (S2010).

As a result of the determination, in the case that the current block is a luma component, flag information related to whether or not transform skip is applied to the current block, that is, transform_skip_flag, is parsed (S2020), and subsequently, the residual signal will be decoded according to the parsing result.

Contrarily, in the case that the current block is not a luma component but a chroma component, whether or not to parse the transform_skip_flag of the chroma component may be determined based on the value of transform_skip_flag for the luma component block at a position corresponding to the reference position (top-left) of the chroma component block (S2030, S2040).

For example, in the case that transform_skip_flag for the luma component block at the position corresponding to the reference position (top-left) of the chroma component block is 1, that is, the luma component block at the position corresponding to the reference position (top-left) of the chroma component block is skipped (S2030), the transform_skip_flag for the chroma component (block) may exist in the bitstream and/or Table 1, and may be parsed (S2040).

Meanwhile, in the case that the value of transform_skip_flag for the luma component (block) is 0, transform_skip_flag for the chroma component (block) may not exist in the bitstream and/or Table 1. In the case that transform_skip_flag for the chroma component does not exist, the decoding apparatus may regard the value of transform_skip_flag for the chroma component as 0 (S2050). In this case, a coded bit for transform_skip_flag for the chroma component may not exist, and thus, compression efficiency may be improved.

Meanwhile, after performing the prediction, a residual signal generated through difference from the original is subjected to the transform and the quantization. For regions where a large amount of residuals are generated, compression without significant degradation of the decoded image may be expected by omitting or reducing information of a high-frequency region that is not easily recognized by the human eye through the transform and quantization processes.

However, when encoding the chroma component, since there are not many complex textures as described above, the prediction accuracy is higher than that of the luma component, and relatively small amount of the energy of the residual information may occur. In this case, there is no significant difference between applying and not applying the transform, and rather, signaling a flag related to whether or not to transform to all transform blocks may act as an overhead.

Accordingly, an embodiment of the present document proposes a method of transmitting a transform skip flag depending on a component of a current block, that is, whether the current block is a luma component block or a chroma component block.

Additionally, in the present embodiment, the transform_skip_flag syntax element of the luma component at a position corresponding to the currently decoded chroma component, for example, of the top-left (center) is first checked, and transform_skip_flag of the chroma component to be decoded only when the transform_skip_flag of the luma component is 1 may be parsed. Contrarily, in the case that transform_skip_flag of the luma component is 0, the transform_skip_flag of the chroma component may be initialized to 0 without being parsed.

Figure 21:
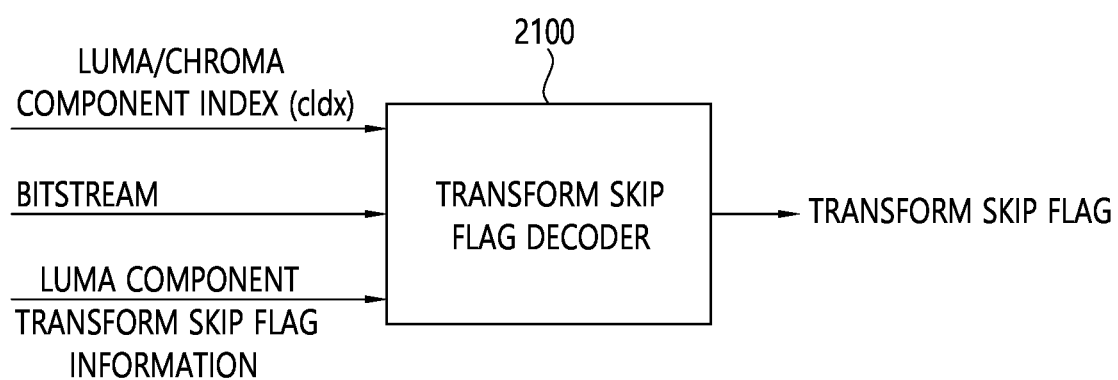
FIG. 21 shows a transform skip flag decoder according to another embodiment of the present document.
Figure 22:
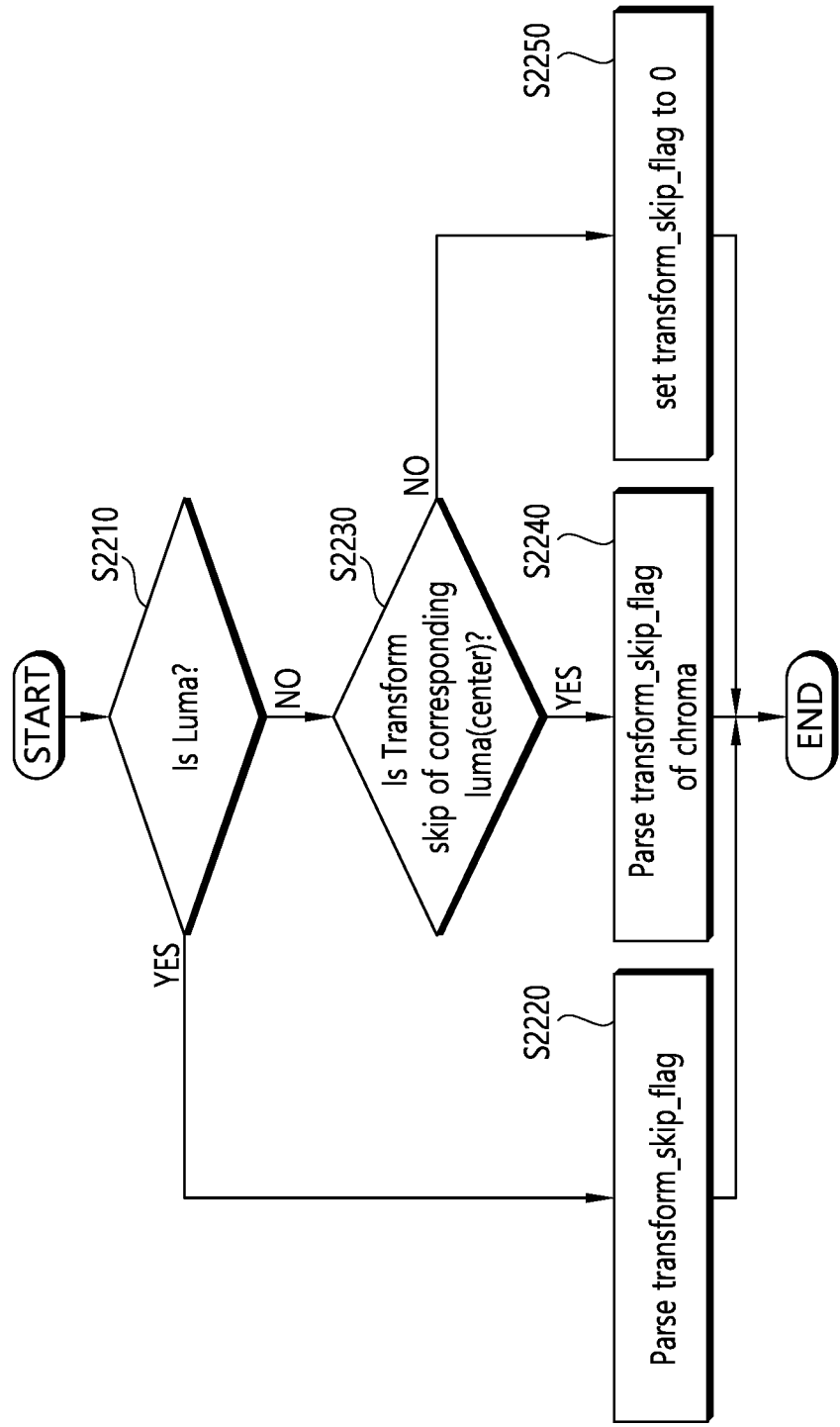
FIG. 22 is a control flowchart illustrating a method of decoding a transform skip flag according to the transform skip flag decoder of FIG. 21.

FIG. 21 shows a transform skip flag decoder according to another embodiment of the present document, and FIG. 22 is a control flowchart illustrating a method of decoding a transform skip flag according to the transform skip flag decoder of FIG. 21.

The transform skip flag decoder 2100 of FIG. 21 may be included in an entropy decoder of a decoding apparatus. As illustrated, a bitstream, luma component transform skip flag information (transform_skip_flag for luma component), and Information on the luma/chroma component index (cIdx) may be input to the transform skip flag decoder 2100, and different transform skip flags may be output depending on the luma/chroma component index and the luma component transform skip flag information. The luma/chroma component index and luma component transform skip flag information may be input with the luma/chroma component index and the luma component transform skip flag information being included in the bitstream.

Meanwhile, in the case that the signals input and output to the transform skip flag decoder 2100 are reversed to each other, and a reverse process of the process performed by the transform skip flag decoder 2100 is performed, a transform skip flag encoder of an encoding apparatus may be implemented.

The luma/chroma component index cIdx of 0 may represent a luma component, the cIdx of 1 may represent Cb of a chroma component, and the cIdx of 2 represent Cr of a chroma component.

Based on the condition shown in FIG. 22, the encoding apparatus may generate and encode residual related information (transform_skip_flag and the like), and the decoding apparatus may parse and decode the residual related information.

As shown in FIG. 22, first, it may be determined whether or not the current block is a luma component (S2210).

As a result of the determination, in the case that the current block is a luma component, flag information related to whether or not transform skip is applied to the current block, that is, transform_skip_flag, is parsed (S2220), and subsequently, the residual signal will be decoded according to the parsing result.

Contrarily, in the case that the current block is not a luma component but a chroma component, whether or not to parse the transform_skip_flag of the chroma component may be determined based on the value of transform_skip_flag for the luma component block at a position corresponding to the reference position (center) of the chroma component block (S2230, S2240).

For example, in the case that transform_skip_flag for the luma component block at the position corresponding to the reference position (center) of the chroma component block is 1, that is, the luma component block at the position corresponding to the reference position (center) of the chroma component block is skipped (S2230), the transform_skip_flag for the chroma component (block) may exist in the bitstream and/or Table 1, and may be parsed (S2240). Here, the center position may indicate a bottom-right sample position among four samples located at the center of a corresponding block.

Meanwhile, in the case that the value of transform_skip_flag for the luma component (block) is 0, transform_skip_flag for the chroma component (block) may not exist in the bitstream and/or Table 1. In the case that transform_skip_flag for the chroma component does not exist, the decoding apparatus may regard the value of transform_skip_flag for the chroma component as 0 (S2250). In this case, a coded bit for transform_skip_flag for the chroma component may not exist, and thus, compression efficiency may be improved.

Meanwhile, after performing the prediction, a residual signal generated through difference from the original is subjected to the transform and the quantization. For regions where a large amount of residuals are generated, compression without significant degradation of the decoded image may be expected by omitting or reducing information of a high-frequency region that is not easily recognized by the human eye through the transform and quantization processes.

However, when encoding the chroma component, since there are not many complex textures as described above, the prediction accuracy is higher than that of the luma component, and relatively small amount of the energy of the residual information may occur. In this case, there is no significant difference between applying and not applying the transform, and rather, signaling a flag related to whether or not to transform to all transform blocks may act as an overhead.

Accordingly, an embodiment of the present document proposes a method of transmitting a transform skip flag depending on whether a chroma component has a dual tree or separate tree structure in which the chroma component does not follow a complex block partition structure of a luma component.

Additionally, in the present embodiment, the transform_skip_flag syntax element of the luma component at a position corresponding to the currently decoded chroma component, for example, of the top-left is first checked, and transform_skip_flag of the chroma component to be decoded only when the transform_skip_flag of the luma component is 1 may be parsed. Contrarily, in the case that transform_skip_flag of the luma component is 0, the transform_skip_flag of the chroma component may be initialized to 0 without being parsed.

Figure 23:
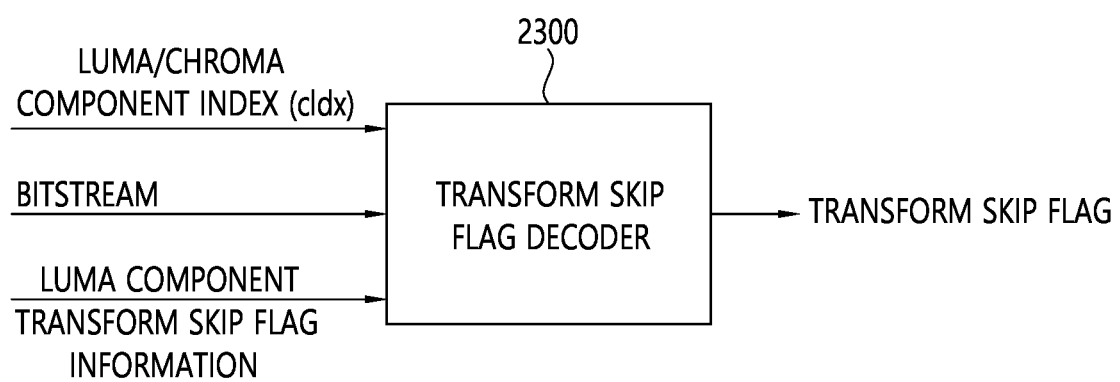
FIG. 23 shows a transform skip flag decoder according to another embodiment of the present document.
Figure 24:
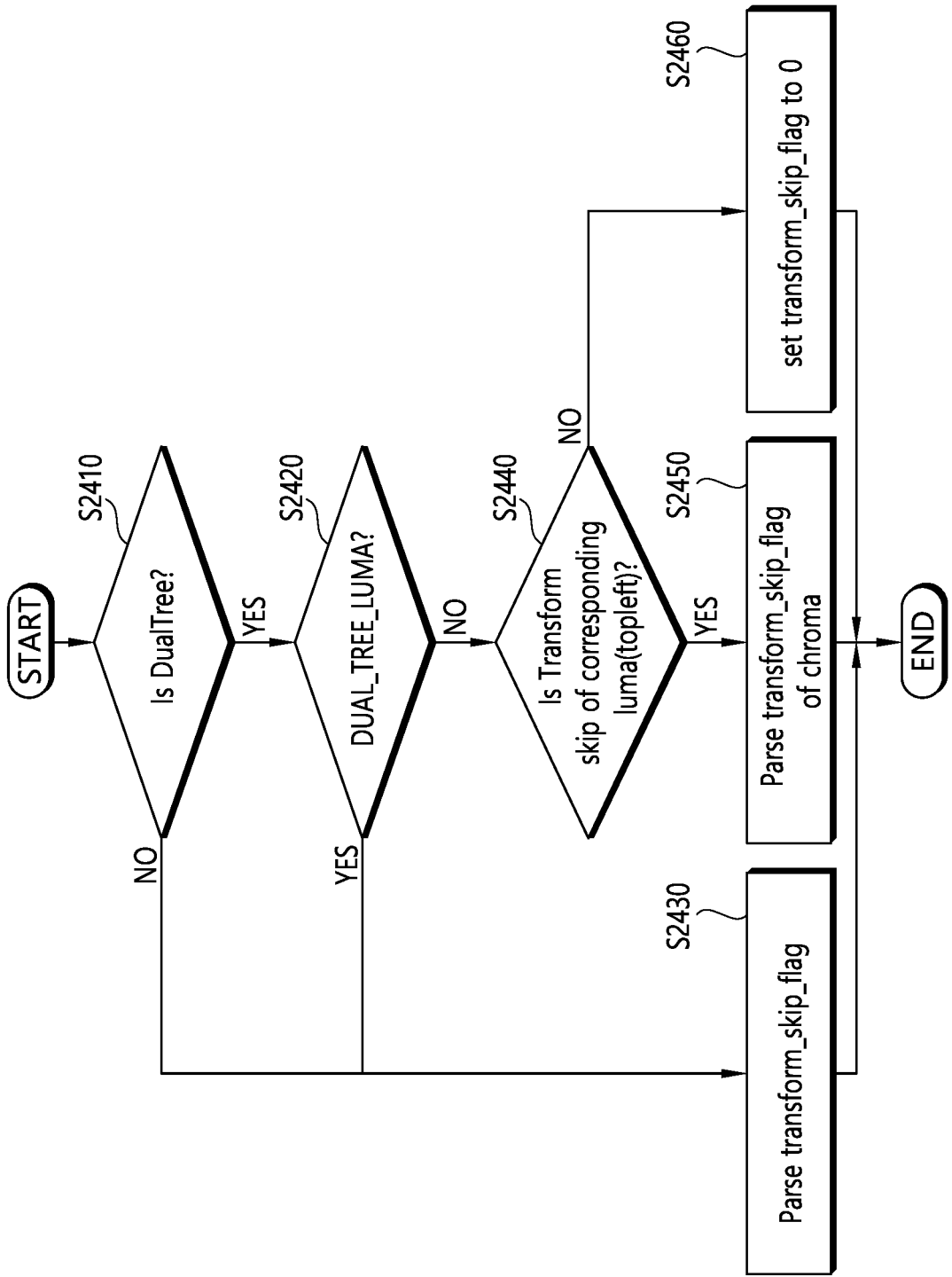
FIG. 24 is a control flowchart illustrating a method of decoding a transform skip flag according to the transform skip flag decoder of FIG. 23.

FIG. 23 shows a transform skip flag decoder according to another embodiment of the present document, and FIG. 24 is a control flowchart illustrating a method of decoding a transform skip flag according to the transform skip flag decoder of FIG. 23.

The transform skip flag decoder 2300 of FIG. 23 may be included in an entropy decoder of a decoding apparatus. As illustrated, a bitstream, luma component transform skip flag information (transform_skip_flag for luma component), and Information on the luma/chroma component index (cIdx) may be input to the transform skip flag decoder 2300, and different transform skip flags may be output depending on the luma/chroma component index and the luma component transform skip flag information. The luma/chroma component index and luma component transform skip flag information may be input with the luma/chroma component index and the luma component transform skip flag information being included in the bitstream.

Meanwhile, in the case that the signals input and output to the transform skip flag decoder 2300 are reversed to each other, and a reverse process of the process performed by the transform skip flag decoder 2300 is performed, a transform skip flag encoder of an encoding apparatus may be implemented.

The tree type (treeType) may be classified into a single tree (INGLE_TREE) or a dual tree (DUAL_TREE) depending on whether or not a luma component block and a corresponding chroma component block have separate partition structures. In the case that the chroma component block has the same partition structure as the luma component block, it may be represented as a single tree, and in the case that the chroma component block has a different partition structure from the luma component block, it may be represented as a dual tree. In the case that the dual tree is applied, the tree type may further indicate whether DUAL_TREE_LUMA or DUAL_TREE_CHROMA is applied.

Based on the condition shown in FIG. 24, the encoding apparatus may generate and encode residual related information (transform_skip_flag and the like), and the decoding apparatus may parse and decode the residual related information.

As shown in FIG. 24, first, it may be determined whether or not a dual tree is applied to the current block (S2410).

As a result of the determination, when the dual tree is applied to the current block, it may be further determined whether or not DUAL_TREE_LUMA is applied to the current block (S2420).

In the case that the dual tree is not applied, or that the dual tree is applied and DUAL_TREE_LUMA is applied, flag information related to whether or not transform skip is applied to the current block, that is, transform_skip_flag, is parsed (S2430), and subsequently, the residual signal will be decoded according to the parsing result.

Contrarily, in the case that DUAL_TREE_LUMA is not applied to the current block, that is, DUAL_TREE_CHROMA is applied, whether or not to parse the transform_skip_flag of the chroma component may be determined based on the value of transform_skip_flag for the luma component block at a position corresponding to the reference position (top-left) of the chroma component block (S2440, S2450).

For example, in the case that transform_skip_flag for the luma component block at the position corresponding to the reference position (top-left) of the chroma component block is 1, that is, the luma component block at the position corresponding to the reference position (top-left) of the chroma component block is skipped (S2440), the transform_skip_flag for the chroma component (block) may exist in the bitstream and/or Table 1, and may be parsed (S2450).

Meanwhile, in the case that the value of transform_skip_flag for the luma component (block) is 0, transform_skip_flag for the chroma component (block) may not exist in the bitstream and/or Table 1. In the case that transform_skip_flag for the chroma component does not exist, the decoding apparatus may regard the value of transform_skip_flag for the chroma component as 0 (S2460). In this case, a coded bit for transform_skip_flag for the chroma component may not exist, and thus, compression efficiency may be improved.

Meanwhile, after performing the prediction, a residual signal generated through difference from the original is subjected to the transform and the quantization. For regions where a large amount of residuals are generated, compression without significant degradation of the decoded image may be expected by omitting or reducing information of a high-frequency region that is not easily recognized by the human eye through the transform and quantization processes.

However, when encoding the chroma component, since there are not many complex textures as described above, the prediction accuracy is higher than that of the luma component, and relatively small amount of the energy of the residual information may occur. In this case, there is no significant difference between applying and not applying the transform, and rather, signaling a flag related to whether or not to transform to all transform blocks may act as an overhead.

Accordingly, an embodiment of the present document proposes a method of transmitting a transform skip flag depending on whether a chroma component has a dual tree or separate tree structure in which the chroma component does not follow a complex block partition structure of a luma component.

Additionally, in the present embodiment, the transform_skip_flag syntax element of the luma component at a position corresponding to the currently decoded chroma component, for example, of the center position is first checked, and transform_skip_flag of the chroma component to be decoded only when the transform_skip_flag of the luma component is 1 may be parsed. Contrarily, in the case that transform_skip_flag of the luma component is 0, the transform_skip_flag of the chroma component may be initialized to 0 without being parsed.

Figure 25:
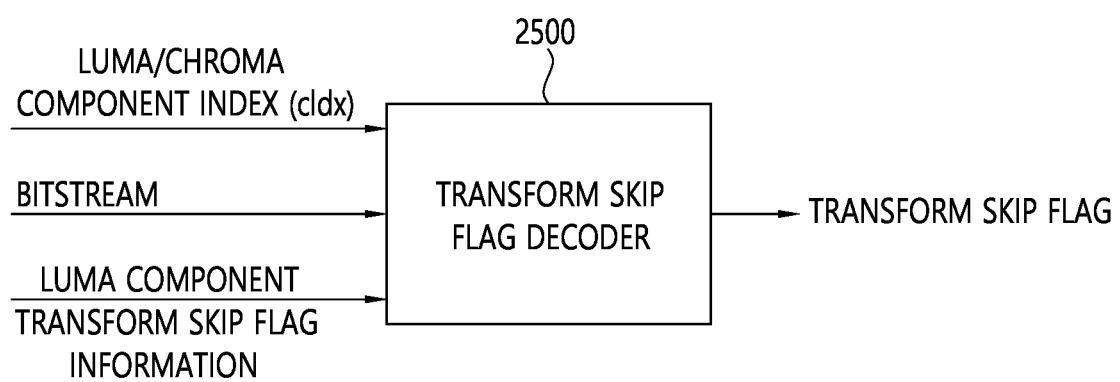
FIG. 25 shows a transform skip flag decoder according to another embodiment of the present document.
Figure 26:
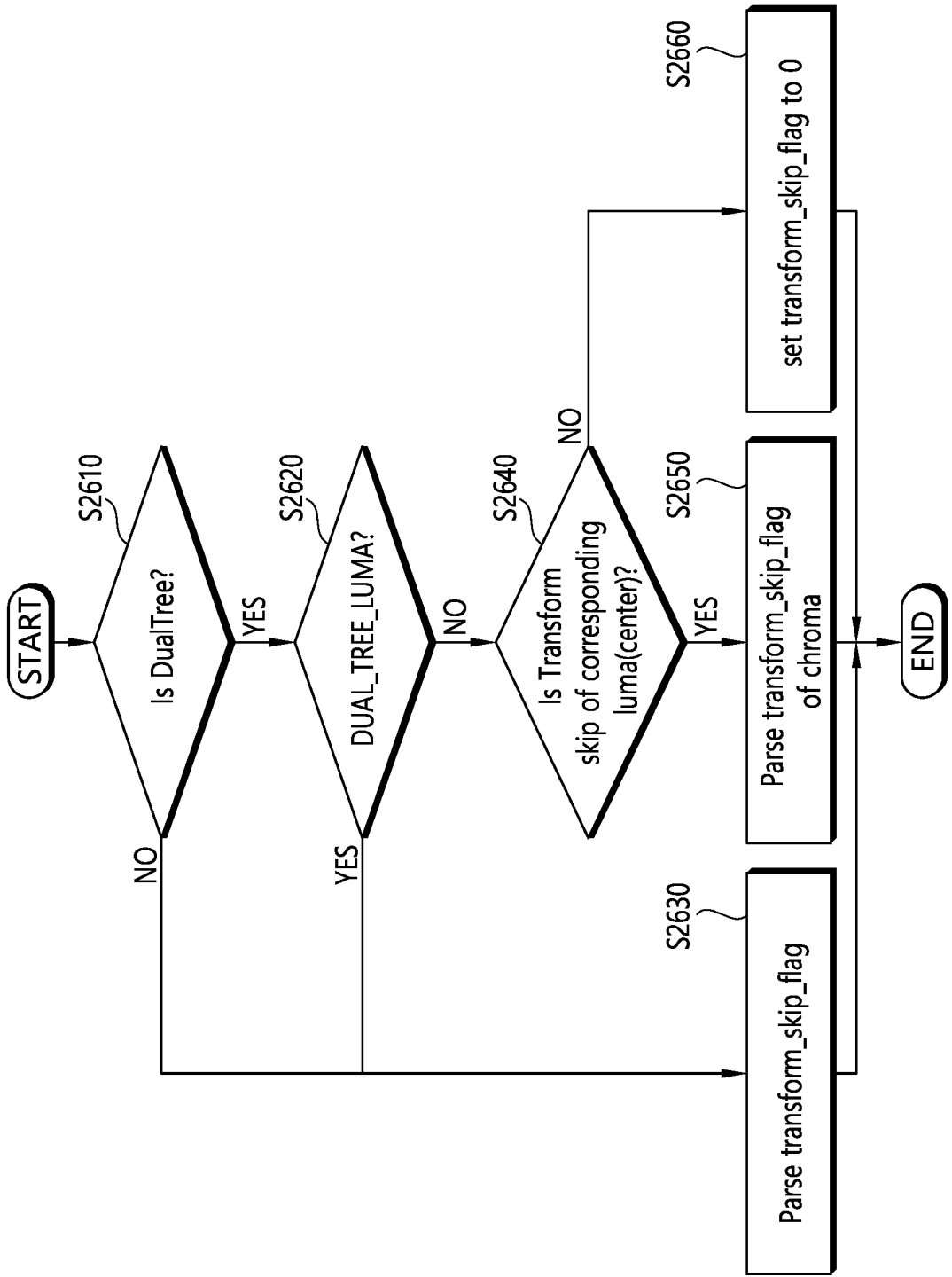
FIG. 26 is a control flowchart illustrating a method of decoding a transform skip flag according to the transform skip flag decoder of FIG. 25.

FIG. 25 shows a transform skip flag decoder according to another embodiment of the present document, and FIG. 26 is a control flowchart illustrating a method of decoding a transform skip flag according to the transform skip flag decoder of FIG. 25.

The transform skip flag decoder 2500 of FIG. 25 may be included in an entropy decoder of a decoding apparatus. As illustrated, a bitstream, luma component transform skip flag information (transform_skip_flag for luma component), and Information on the luma/chroma component index (cIdx) may be input to the transform skip flag decoder 2500, and different transform skip flags may be output depending on the luma/chroma component index and the luma component transform skip flag information. The luma/chroma component index and luma component transform skip flag information may be input with the luma/chroma component index and the luma component transform skip flag information being included in the bitstream.

Meanwhile, in the case that the signals input and output to the transform skip flag decoder 2500 are reversed to each other, and a reverse process of the process performed by the transform skip flag decoder 2500 is performed, a transform skip flag encoder of an encoding apparatus may be implemented.

The tree type (treeType) may be classified into a single tree (INGLE_TREE) or a dual tree (DUAL_TREE) depending on whether or not a luma component block and a corresponding chroma component block have separate partition structures. In the case that the chroma component block has the same partition structure as the luma component block, it may be represented as a single tree, and in the case that the chroma component block has a different partition structure from the luma component block, it may be represented as a dual tree. In the case that the dual tree is applied, the tree type may further indicate whether DUAL_TREE_LUMA or DUAL_TREE_CHROMA is applied.

Based on the condition shown in FIG. 26, the encoding apparatus may generate and encode residual related information (transform_skip_flag and the like), and the decoding apparatus may parse and decode the residual related information.

As shown in FIG. 26, first, it may be determined whether or not a dual tree is applied to the current block (S2610).

As a result of the determination, when the dual tree is applied to the current block, it may be further determined whether or not DUAL_TREE_LUMA is applied to the current block (S2620).

In the case that the dual tree is not applied, or that the dual tree is applied and DUAL_TREE_LUMA is applied, flag information related to whether or not transform skip is applied to the current block, that is, transform_skip_flag, is parsed (S2630), and subsequently, the residual signal will be decoded according to the parsing result.

Contrarily, in the case that DUAL_TREE_LUMA is not applied to the current block, that is, DUAL_TREE_CHROMA is applied, whether or not to parse the transform_skip_flag of the chroma component may be determined based on the value of transform_skip_flag for the luma component block at a position corresponding to the reference position (center) of the chroma component block (S2640, S2650).

For example, in the case that transform_skip_flag for the luma component block at the position corresponding to the reference position (center) of the chroma component block is 1, that is, the luma component block at the position corresponding to the reference position (center) of the chroma component block is skipped (S2640), the transform_skip_flag for the chroma component (block) may exist in the bitstream and/or Table 1, and may be parsed (S2650). Here, the center position may indicate a bottom-right sample position among four samples located at the center of a corresponding block.

Meanwhile, in the case that the value of transform_skip_flag for the luma component (block) is 0, transform_skip_flag for the chroma component (block) may not exist in the bitstream and/or Table 1. In the case that transform_skip_flag for the chroma component does not exist, the decoding apparatus may regard the value of transform_skip_flag for the chroma component as 0 (S2660). In this case, a coded bit for transform_skip_flag for the chroma component may not exist, and thus, compression efficiency may be improved.

Figure 27:
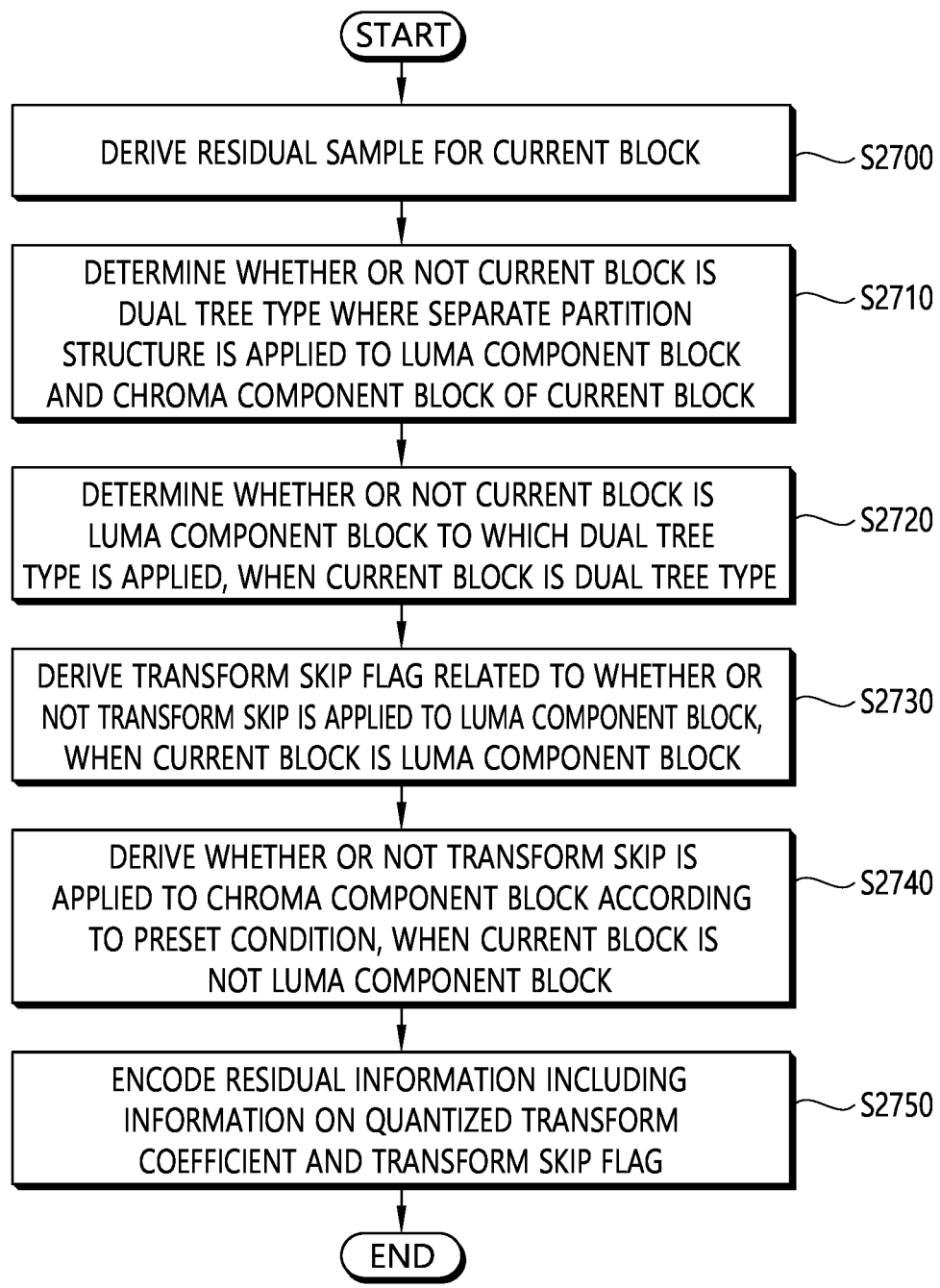
FIG. 27 is a flowchart showing operation of an encoding apparatus according to an example.
Figure 28:
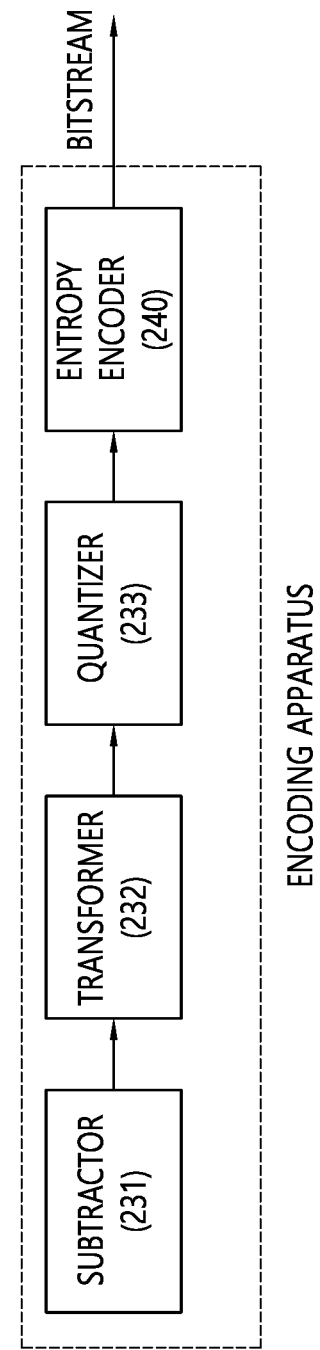
FIG. 28 is a block diagram showing a configuration of an encoding apparatus according to an example.

FIG. 27 is a flowchart showing operation of an encoding apparatus according to an example, and FIG. 28 is a block diagram showing configuration of an encoding apparatus according to an example.

Figure 29:
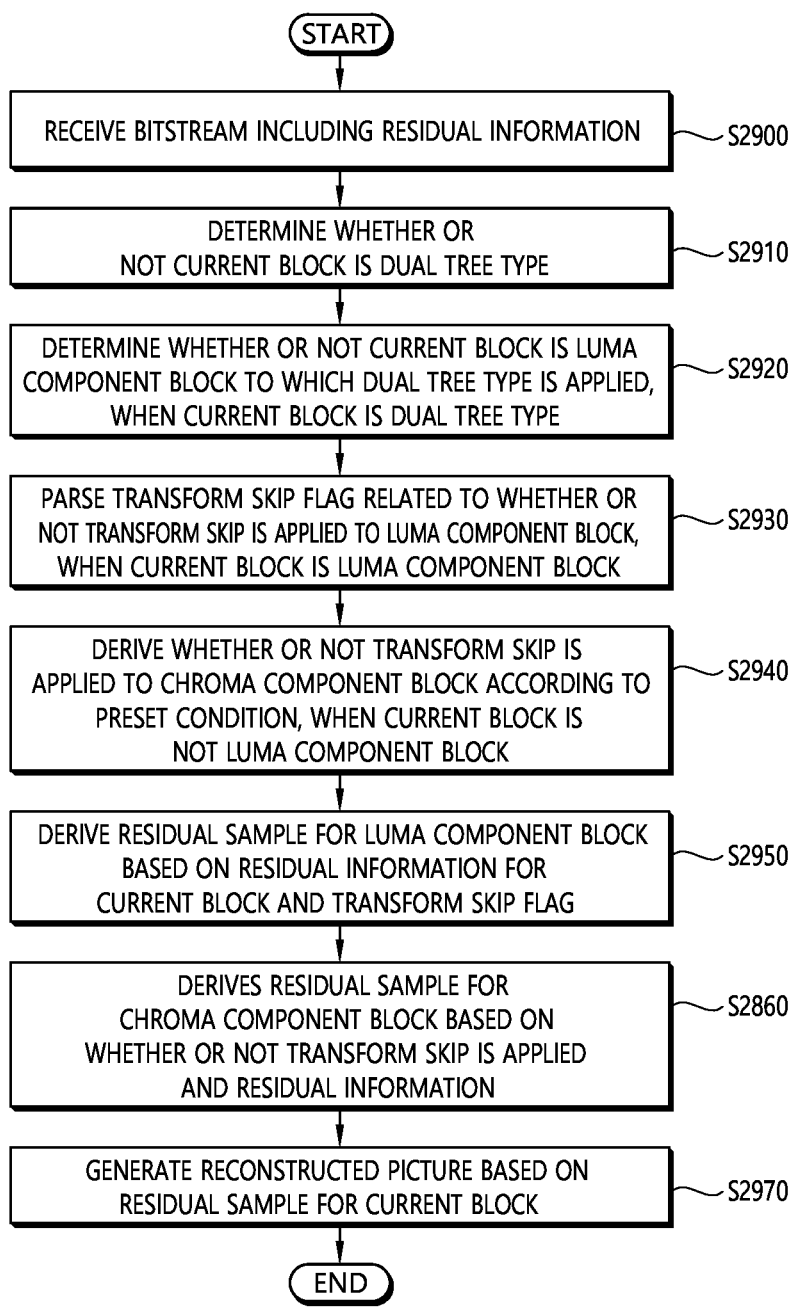
FIG. 29 is a flowchart showing operation of a decoding apparatus according to an example.
Figure 30:
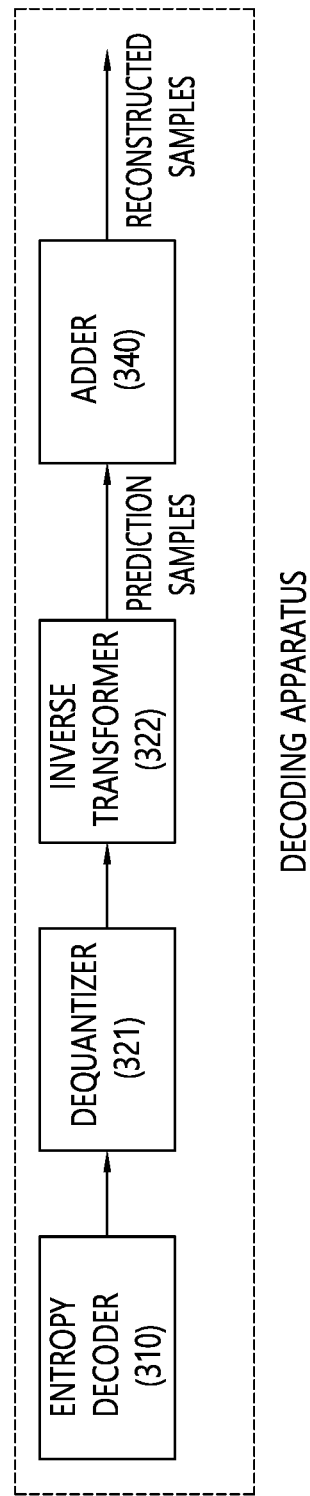
FIG. 30 is a block diagram showing a configuration of a decoding apparatus according to an example.

The encoding apparatus according to FIGS. 27 and 28 may perform operations corresponding to those of a decoding apparatus according to FIGS. 29 and 30. Therefore, operations of the decoding apparatus to be described later with reference to FIGS. 29 and 30 may be similarly applied to the encoding apparatus according to FIGS. 27 and 28.

Each of steps disclosed in FIG. 27 may be performed by the encoding apparatus 200 disclosed in FIG. 2. More specifically, S2700 may be performed by the subtractor 231 disclosed in FIG. 2, S2710 to S2740 may be performed by the transformer 232 disclosed in FIG. 2, and S2750 may be performed by the entropy encoder 240 disclosed in FIG. 2. Further, operations according to S2700 to S2750 are based on some of contents described above with reference to FIGS. 2 to 26. Therefore, an explanation for the specific content duplicated with contents described above with reference to FIGS. 2 to 26 will be omitted or made briefly.

As shown in FIG. 28, the encoding apparatus according to an example may include the subtractor 231, the transformer 232, the quantizer 233, and the entropy encoder 240. However, in some cases, all of the components shown in FIG. 28 may not be essential components of the encoding apparatus, and the encoding apparatus may be implemented by more or less components than those shown in FIG. 15.

In the encoding apparatus according to an embodiment, each of the subtractor 231, the transformer 232, the quantizer 233, and the entropy encoder 240 may be embodied by a separate chip, or at least two or more components may be embodied through a single chip.

The encoding apparatus according to an example may derive a residual sample for a current block (S2700). More specifically, the subtractor 231 of the encoding apparatus may derive a residual sample for a current block.

Then, various pieces of information for encoding the residual sample may be derived and encoded.

The encoding apparatus determines whether or not a current block is a dual tree type where separate partition structures are applied to a luma component block and a chroma component block of the current block (S2710).

As a result of said determination, in the case that the current block is the dual tree type, it may be determined whether or not the current block is a luma component block to which the dual tree type is applied (S2720).

The encoding apparatus may derive a transform skip flag related to whether or not transform skip is applied to the luma component block, when the current block is the luma component block (S2730), and may derive whether or not transform skip is applied to the chroma component block according to a preset condition, when the current block is not the luma component block (S2740).

In the step of deriving whether or not the transform skip is applied to the chroma component block, the encoding apparatus may set the transform skip to not being applied to the chroma component block, and, according to another embodiment, the encoding apparatus may derive as the value of the transform skip flag of the luma component block corresponding to a preset reference position of the chroma component block. In this case, the reference position may be an uppermost position or a center position of the chroma component block.

Alternatively, according to another embodiment, the encoding apparatus may determine whether or not a value of the transform skip flag of the luma component block corresponding to a preset reference position of the chroma component block is 1, may generate the transform skip flag for the chroma component block, when the value of the transform skip flag of the luma component block is 1, and may set the transform skip to not being applied to the chroma component block, when the value of the transform skip flag is 0. In this case, the reference position may be an uppermost position or a center position of the chroma component block.

Thereafter, the encoding apparatus may encode residual information including information on the quantized transform coefficient, and the transform skip flag (S2750).

FIG. 29 is a flowchart showing operation of an decoding apparatus according to an example, and FIG. 30 is a block diagram showing configuration of an decoding apparatus according to an example.

Each of steps disclosed in FIG. 29 may be performed by the decoding apparatus 300 disclosed in FIG. 3. More specifically, S2900 may be performed by the entropy decoder 310 disclosed in FIG. 3, S2910 to S2940 may be performed by the dequantizer 321 and/or the inverse transformer 322 disclosed in FIG. 3, and S2950 may be performed by the adder 340 disclosed in FIG. 3. Further, operations according to S2900 to S2950 are based on some of contents described above with reference to FIGS. 2 to 26. Therefore, an explanation for the specific content duplicated with contents described above with reference to FIGS. 2 to 26 will be omitted or made briefly.

As shown in FIG. 30, the decoding apparatus according to an example may include the entropy decoder 310, the dequantizer 321, the inverse transformer 322, and the adder 340. However, in some cases, all of the components shown in FIG. 30 may not be essential components of the decoding apparatus, and the decoding apparatus may be implemented by more or less components than those shown in FIG. 30.

In the decoding apparatus according to an embodiment, each of the entropy decoder 310, the dequantizer 321, the inverse transformer 322, and the adder 340 may be embodied by a separate chip, or at least two or more components may be embodied through a single chip.

The decoding apparatus according to an example may receive a bitstream including residual information (S2900).

More specifically, the entropy decoder 310 of the decoding apparatus may receive a bitstream including residual information.

The decoding apparatus may determine whether or not the current block is a dual tree type (S2910). The decoding apparatus may determine whether or not the current block is a dual tree type through a signal directly received from the encoding apparatus, or may derive through the size and partitioning information of the current block.

As a result of said determination, in the case that the current block is the dual tree type, it may be determined whether or not the current block is a luma component block to which the dual tree type is applied (S2920).

The decoding apparatus may receive and parse a transform skip flag related to whether or not transform skip is applied to the luma component block, when the current block is the luma component block (S2930). The transform skip flag may be performed on the bitstream reception step.

In the case that the current block is not the luma component block, the decoding apparatus may derives whether or not transform skip is applied to the chroma component block according to a preset condition (S2940).

In the step of deriving whether or not the transform skip is applied to the chroma component block, the decoding apparatus may set the transform skip to not being applied to the chroma component block, and, according to another embodiment, the decoding apparatus may derive as the value of the transform skip flag of the luma component block corresponding to a preset reference position of the chroma component block. In this case, the reference position may be an uppermost position or a center position of the chroma component block.

Alternatively, according to another embodiment, the decoding apparatus may determine whether or not a value of the transform skip flag of the luma component block corresponding to a preset reference position of the chroma component block is 1, may generate the transform skip flag for the chroma component block, when the value of the transform skip flag of the luma component block is 1, and may set the transform skip to not being applied to the chroma component block, when the value of the transform skip flag is 0. In this case, the reference position may be an uppermost position or a center position of the chroma component block.

Alternatively, according to another embodiment, the decoding apparatus may receive component information related to whether the current block is a luma component block or a chroma component block, and residual information for the current block, and may derive whether or not transform skip is applied to the chroma component block depending on whether or the current block is a luma component block.

Even in this case, the decoding apparatus may set the transform skip to not being applied to the chroma component block, and, according to another embodiment, the decoding apparatus may derive as the value of the transform skip flag of the luma component block corresponding to a preset reference position of the chroma component block. In this case, the reference position may be an uppermost position or a center position of the chroma component block.

Alternatively, according to another embodiment, the decoding apparatus may determine whether or not a value of the transform skip flag of the luma component block corresponding to a preset reference position of the chroma component block is 1, may generate the transform skip flag for the chroma component block, when the value of the transform skip flag of the luma component block is 1, and may set the transform skip to not being applied to the chroma component block, when the value of the transform skip flag is 0. In this case, the reference position may be an uppermost position or a center position of the chroma component block.

The decoding apparatus according to an embodiment may derive a (quantized) transform coefficient for a luma component block of the current block based on the residual information included in a bitstream, and the transform skip flag value (S2950).

In addition, the decoding apparatus may derive a residual sample for a chroma component block of the current block based on whether or not transform skip is applied, and the residual information (S2960).

More specifically, the entropy decoder 310 of the decoding apparatus may derive the quantized transform coefficient for the current block based on the residual information included in the bitstream.

More specifically, the dequantizer 321 of the decoding apparatus may derive the transform coefficient from the quantized transform coefficient based on the dequantization process, and the inverse transformer 322 of the decoding apparatus may inverse transform the transform coefficient, and derive the residual sample for the current block.

The decoding apparatus according to an embodiment may generate a reconstructed picture based on the residual sample for the current block (S2970). More specifically, the adder 340 of the decoding apparatus may generate the reconstructed picture based on the residual sample for the current block.

While in the above-described embodiments, the methods are described based on the flowchart having a series of steps or blocks, the present document is not limited to the above-described order of the steps or blocks, and a certain step may occur simultaneously with other step or in a different order from that described above. Further, it may be understood by a person having ordinary skill in the art that the steps shown in a flowchart is not exhaustive, and that another step may be incorporated or one or more steps of the flowchart may be removed without affecting the scope of the present document.

The foregoing methods according to the present document may be implemented in a software form, and the encoding apparatus and/or decoding apparatus according to the document may be included in an apparatus for performing image processing of, for example, a TV, a computer, a smartphone, a set-top box, and a display device.

When embodiments in the present document are implemented in software, the above-described methods may be embodied as modules (processes, functions or the like) for performing the above-described functions. The modules may be stored in a memory and may be executed by a processor. The memory may be inside or outside the processor and may be connected to the processor in various well-known means. The processor may include an application-specific integrated circuit (ASIC), a different chipset, a logic circuit, and/or a data processor. The memory may include a read-only memory (ROM), a random access memory (RAM), a flash memory, a memory card, a storage medium, and/or another storage device. That is, embodiments described in the present document may be embodied and performed on a processor, a microprocessor, a controller or a chip. For example, functional units shown in each drawing may be embodied and performed on a computer, a processor, a microprocessor, a controller or a chip. In this case, information (e.g., information on instructions) or algorithm for realization may be stored in a digital storage medium.

Further, the decoding apparatus and the encoding apparatus to which the present document is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an internet streaming service providing device, a three-dimensional (3D) video device, a virtual reality device, an augmented reality (argumente reality) device, a video telephony video device, a transportation means terminal (e.g., a vehicle (including an autonomous vehicle) terminal, an aircraft terminal, a ship terminal, etc.) and a medical video device, and may be used to process a video signal or a data signal. For example, the over the top (OTT) video device may include a game console, a Blu-ray player, an Internet access TV, a home theater system, a smart phone, a tablet PC, a digital video recorder (DVR) and the like.

In addition, the processing method to which the present document is applied may be produced in the form of a program executed by a computer, and be stored in a computer-readable recording medium. Multimedia data having a data structure according to the present document may be also stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network.

Additionally, the embodiments of the present document may be embodied as a computer program product by program codes, and the program codes may be performed in a computer by the embodiment of the document. The program codes may be stored on a computer-readable carrier.

Figure 31:
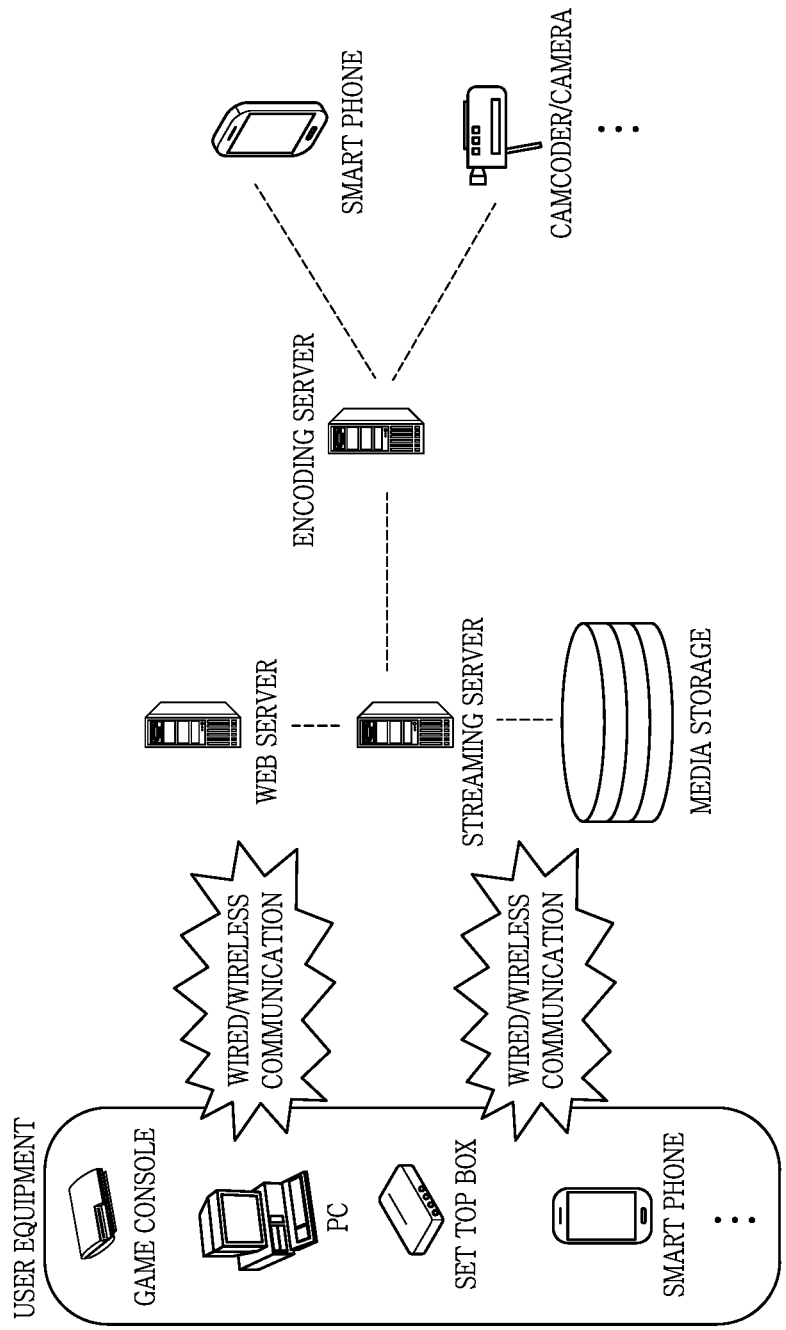
FIG. 31 illustratively represents a content streaming system structure diagram to which an embodiment disclosed in the present document may be applied.

FIG. 31 represents an example of a contents streaming system to which the present document may be applied.

Referring to FIG. 31, the content streaming system to which the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. An image decoding method performed by a decoding apparatus, the method comprising:
   determining whether or not a current block is a dual tree type where separate partition structures are applied to a luma component block and a chroma component block of the current block;
   determining whether or not the current block is a luma component block to which the dual tree type is applied, based on the current block being the dual tree type;
   parsing a transform skip flag related to whether or not transform skip is applied to the luma component block, based on the current block being the luma component block;
   deriving whether or not transform skip is applied to the chroma component block according to a preset condition, based on the current block not being the luma component block;
   deriving a residual sample for the luma component block based on residual information for the current block and the transform skip flag;
   deriving a residual sample for the chroma component block based on whether or not the transform skip is applied and the residual information; and
   generating a reconstructed picture based on the residual sample for the current block.

2. The image decoding method of claim 1, wherein the deriving whether or not the transform skip is applied to the chroma component block sets a value of the transform skip flag for the chroma component block to 0.

3. The image decoding method of claim 1, wherein the deriving whether or not the transform skip is applied to the chroma component block is set to a value of the transform skip flag of the luma component block corresponding to a preset reference position of the chroma component block.

4. The image decoding method of claim 3, wherein the reference position is a top-left position or center position of the chroma component block.

5. The image decoding method of claim 1, wherein the deriving whether or not the transform skip is applied to the chroma component block comprises:
   determining whether or not a value of the transform skip flag of the luma component block corresponding to a preset reference position of the chroma component block is 1; and
   parsing the transform skip flag for the chroma component block based on the value of the transform skip flag being 1, and setting the value of the transform skip flag for the chroma component block to 0 based on the value of the transform skip flag value being 0.

6. The image decoding method of claim 5, wherein the reference position is a top-left position or center position of the chroma component block.

7. An image encoding method performed by an encoding apparatus, the method comprising:
   deriving a residual sample for a current block;
   determining whether or not a current block is a dual tree type where separate partition structures are applied to a luma component block and a chroma component block of the current block;
   determining whether or not the current block is a luma component block to which the dual tree type is applied, based on the current block being the dual tree type;
   deriving a transform skip flag related to whether or not transform skip is applied to the luma component block, based on the current block being the luma component block;
   deriving whether or not transform skip is applied to the chroma component block according to a preset condition, based on the current block not being the luma component block; and
   encoding image information including residual information for the current block and the transform skip flag.

8. The image encoding method of claim 7, wherein the deriving whether or not the transform skip is applied to the chroma component block derives that the transform skip is not applied to the chroma component block.

9. The image encoding method of claim 7, wherein the deriving whether or not the transform skip is applied to the chroma component block derives as a value of the transform skip flag of the luma component block corresponding to a preset reference position of the chroma component block.

10. The image encoding method of claim 9, wherein the reference position is a top-left position or center position of the chroma component block.

11. The image encoding method of claim 7, wherein the deriving whether or not the transform skip is applied to the chroma component block comprises:
   determining whether or not a value of the transform skip flag of the luma component block corresponding to a preset reference position of the chroma component block is 1; and
   generating the transform skip flag for the chroma component block based on the value of the transform skip flag being 1, and setting the transform skip to not being applied to the chroma component block based on the value of the transform skip flag being 0.

12. The image encoding method of claim 11, wherein the reference position is a top-left position or center position of the chroma component block.

13. Non-transitory computer-readable storage medium storing a bitstream causing a decoding apparatus to perform an image decoding method, the method comprising:

determining whether or not a current block is a dual tree type where separate partition structures are applied to a luma component block and a chroma component block of the current block;

determining whether or not the current block is a luma component block to which the dual tree type is applied, based on the current block being the dual tree type;

parsing a transform skip flag related to whether or not transform skip is applied to the luma component block, based on the current block being the luma component block;

deriving whether or not transform skip is applied to the chroma component block according to a preset condition, based on the current block not being the luma component block;

deriving a residual sample for the luma component block based on residual information for the current block and the transform skip flag;

deriving a residual sample for the chroma component block based on whether or not the transform skip is applied and the residual information; and generating a reconstructed picture based on the residual sample for the current block.

* * * * *